US011295028B2

(12) United States Patent
Hetzler et al.

(10) Patent No.: US 11,295,028 B2
(45) Date of Patent: Apr. 5, 2022

(54) MULTI-KEY ENCRYPTED DATA DEDUPLICATION

(71) Applicant: International Business Machines Corporation, Armonk, NY (US)

(72) Inventors: Steven Robert Hetzler, Los Altos, CA (US); Wayne C. Hineman, San Jose, CA (US); John Stewart Best, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 16/938,459

(22) Filed: Jul. 24, 2020

(65) Prior Publication Data
US 2022/0027483 A1    Jan. 27, 2022

(51) Int. Cl.
| | |
|---|---|
| H04L 29/06 | (2006.01) |
| G06F 21/62 | (2013.01) |
| H04L 9/08 | (2006.01) |
| G06F 16/215 | (2019.01) |
| H04L 9/14 | (2006.01) |
| H04L 9/06 | (2006.01) |

(52) U.S. Cl.
CPC ............ G06F 21/62 (2013.01); G06F 16/215 (2019.01); H04L 9/0618 (2013.01); H04L 9/0819 (2013.01); H04L 9/14 (2013.01); H04L 63/0428 (2013.01)

(58) Field of Classification Search
CPC ..... G06F 21/62; G06F 16/215; H04L 9/0618; H04L 9/0819; H04L 9/14; H04L 63/0428
USPC .......................................................... 713/164
See application file for complete search history.

(56) References Cited

U.S. PATENT DOCUMENTS

| 8,005,225 B2 | 8/2011 | Kim et al. |
| 8,074,049 B2 * | 12/2011 | Gelson ................ G06F 11/1464 |
| | | 711/216 |

(Continued)

FOREIGN PATENT DOCUMENTS

| CN | 108377237 A | 8/2018 |
| CN | 110109617 A | 8/2019 |
| WO | 2009134662 A2 | 11/2009 |

OTHER PUBLICATIONS

Hetzler, S., U.S. Appl. No. 16/544,708, filed Aug. 19, 2019.

(Continued)

*Primary Examiner* — Amare F Tabor
(74) *Attorney, Agent, or Firm* — Zilka-Kotab, P.C.

(57) ABSTRACT

A computer-implemented method includes sending key group information to a storage system. The key group information includes keyID information for client data keys in the key group. The client data keys enable deduplication of data chunks encrypted in any of the client data keys in the key group. The method also includes generating deduplication information. The deduplication information includes fingerprints associated with chunks of client data. The method also includes encrypting the data chunks with one of the client data keys, wherein a corresponding decryption key for the encrypted data chunks is not available to the storage system. The method includes sending the deduplication information to the storage system for use in a deduplication process by the storage system and sending the encrypted data chunks to the storage system.

25 Claims, 11 Drawing Sheets

(56) References Cited

U.S. PATENT DOCUMENTS

| | | | |
|---|---|---|---|
| 8,117,464 B1* | 2/2012 | Kogelnik | H04L 67/1097 |
| | | | 713/193 |
| 8,930,686 B2 | 1/2015 | Augenstein et al. | |
| 8,996,467 B2 | 3/2015 | Apte et al. | |
| 9,086,819 B2* | 7/2015 | Panchbudhe | G06F 3/0608 |
| 9,547,774 B2 | 1/2017 | Bestler et al. | |
| 10,158,483 B1 | 12/2018 | Newman | |
| 10,417,202 B2* | 9/2019 | Nazari | G06F 3/067 |
| 11,010,485 B1* | 5/2021 | Devlin | H04L 9/3273 |
| 2015/0227757 A1 | 8/2015 | Bestler et al. | |
| 2016/0344553 A1 | 11/2016 | Chen et al. | |
| 2017/0123710 A1* | 5/2017 | Fisher | H04L 9/14 |
| 2017/0286696 A1 | 10/2017 | Shetty et al. | |
| 2017/0288861 A1 | 10/2017 | Matthews | |
| 2018/0032261 A1 | 2/2018 | Singhai et al. | |
| 2019/0097789 A1 | 3/2019 | Rangayyan et al. | |
| 2020/0119911 A1 | 4/2020 | Shemer et al. | |

OTHER PUBLICATIONS

Brocade, "Encryption Solution Design and Deployment Considerations," Brocade Communications Systems Inc., Data Center Reference Guide, 2013, pp. 1-58.

CSRC, "Cloud Computing," Computer Security Resource Center, Oct. 2017, 3 pages, retrieved from https://csrc.nist.gov/projects/cloud-computing.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

Zhou et al., "SecDep: A User-Aware Efficient Fine-Grained Secure Deduplication Scheme with Multi-Level Key Management," IEEE, 2015, 15 pages.

Muthurajkumar, S., "Data Storage and Retrieval with Deduplication in Secured Cloud Storage," International Journal of Engineering and Advanced Technology (IJEAT), vol. 9, No. 1, Oct. 2019, pp. 609-615.

Duan, Y., "Distributed Key Generation for Encrypted Deduplication: Achieving the Strongest Privacy," CCSW'14, Nov. 7, 2014, pp. 57-68.

International Search Report and Written Opinion from PCT Application No. PCT/IB2021/056036, dated Oct. 12, 2021.

* cited by examiner

1100

```
┌─────────────────────────────────────────────────┐
│ Send Key Group Information to a Storage System, │
│ Wherein the Key Group Information Includes KeyID│
│ Information for Client Data Keys In the Key Group,│ ─── 1102
│ Wherein the Client Data Keys Enable Deduplication of│
│ Data Chunks Encrypted in Any of the Client Secret│
│              Keys In the Key Group              │
└─────────────────────────────────────────────────┘
                         │
                         ▼
┌─────────────────────────────────────────────────┐
│  Generate Deduplication Information, Wherein the│
│  Deduplication Information Includes Fingerprints│ ─── 1104
│     Associated with Chunks of Client Data       │
└─────────────────────────────────────────────────┘
                         │
                         ▼
┌─────────────────────────────────────────────────┐
│ Encrypt the Data Chunks with One of the Client Data│
│ Keys, Wherein a Corresponding Decryption Key for│ ─── 1106
│ the Encrypted Data Chunks is Not Available to the│
│                 Storage System                  │
└─────────────────────────────────────────────────┘
                         │
                         ▼
┌─────────────────────────────────────────────────┐
│ Send the Deduplication Information to the Storage│
│ System for Use In a Deduplication Process by the│ ─── 1108
│                 Storage System                  │
└─────────────────────────────────────────────────┘
                         │
                         ▼
┌─────────────────────────────────────────────────┐
│ Send the Encrypted Data Chunks to the Storage   │ ─── 1110
│                    System                       │
└─────────────────────────────────────────────────┘
```

FIG. 11

MULTI-KEY ENCRYPTED DATA DEDUPLICATION

BACKGROUND

The present invention relates to data deduplication, and more particularly, this invention relates to multi-key encrypted data deduplication in cloud storage systems and networks.

Conventional data reduction techniques, such as deduplication and/or compression, do not provide meaningful reduction when applied to encrypted data. Deduplication of multiple sets of data, each encrypted with a unique encryption key, breaks down where the various encryption algorithms prevent conventional deduplication processes from identifying duplicate data chunks. Conventional data reduction techniques also do not provide adequate data privacy between the client and the storage system.

For example, one known bring your own key (BYOK) encryption technique involves a multi-party trust system. Although all data reduction functions may be provided by the storage system which has access to all the data, conventional BYOK systems provide no data privacy between the storage system and the client because the storage system has access to the client key. The third party key service also has access to the shared encryption key used to encrypt the client data. Data privacy only exists between the users for this form of BYOK encryption.

Conventional at-rest encryption encrypts unencrypted input data with key(s) known to the storage system. The storage system may decrypt all the data and perform deduplication against all the data in the system. However, at-rest encryption provides no data privacy.

Conventional full client-side encryption encrypts the data with a key unknown to the storage system. The storage system only deduplicates data encrypted with a common key. Full client-side deduplication provides relatively high data privacy but impedes deduplication efficiency.

BRIEF SUMMARY

A computer-implemented method, according to one approach, includes sending key group information to a storage system. The key group information includes keyID information for client data keys in the key group. The client data keys enable deduplication of data chunks encrypted in any of the client data keys in the key group. The method also includes generating deduplication information. The deduplication information includes fingerprints associated with chunks of client data. The method also includes encrypting the data chunks with one of the client data keys, wherein a corresponding decryption key for the encrypted data chunks is not available to the storage system. The method includes sending the deduplication information to the storage system for use in a deduplication process by the storage system and sending the encrypted data chunks to the storage system. The foregoing method provides the benefit of enabling deduplication across data encrypted in any data key of a set of data keys without the storage system having access to the data keys.

The computer-implemented method optionally includes encrypting the fingerprints with a client secret fingerprint key prior to sending the deduplication information to the storage system. This optional operation provides the benefit of increasing data privacy between the client and the storage system.

The computer-implemented method optionally includes requesting the client data from the storage system and receiving the client data as the data chunks. One or more of the data chunks may be encrypted with the client secret key and one or more other of the data chunks may be encrypted with the client deduplication key. This optional operation provides efficient deduplication by increasing the set of data on which deduplication operations may be performed.

A system, according to another approach, includes a processor; and logic integrated with the processor, executable by the processor, or integrated with and executable by the processor. The logic is configured to perform the foregoing method.

A computer program product, according to another approach, includes one or more computer readable storage media, and program instructions collectively stored on the one or more computer readable storage media, the program instructions include program instructions to perform the foregoing method.

A computer-implemented method, according to one approach, includes receiving key group information at a storage system. The key group information includes keyID information for client data keys in the key group. The client data keys enable deduplication of data chunks encrypted in any of the client data keys in the key group. The method includes receiving encrypted client data for storage in the storage system and receiving deduplication information. The deduplication information is accessible to the storage system for performing operations thereon and the deduplication information includes fingerprints associated with chunks of the encrypted client data. The method also include identifying data chunks for deduplication based on the deduplication information and, for data chunks which are not identified for deduplication, requesting client data associated with the data chunks encrypted in one of the client data keys. The foregoing method provides the benefit of enabling deduplication across data encrypted in any data key in of a set of data keys without the storage system having access to the data keys.

The computer-implemented method optionally includes that the fingerprints are encrypted with a client secret fingerprint key and the client secret fingerprint key is unavailable to the storage system. This optional approach increases secure access to client data where the client possesses a set of data keys without the storage system having access to the data keys.

A system, according to another approach, includes a processor; and logic integrated with the processor, executable by the processor, or integrated with and executable by the processor. The logic is configured to perform the foregoing method.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 11 is a flowchart of a method, in accordance with one aspect of the present invention.

DETAILED DESCRIPTION

Figure 1:
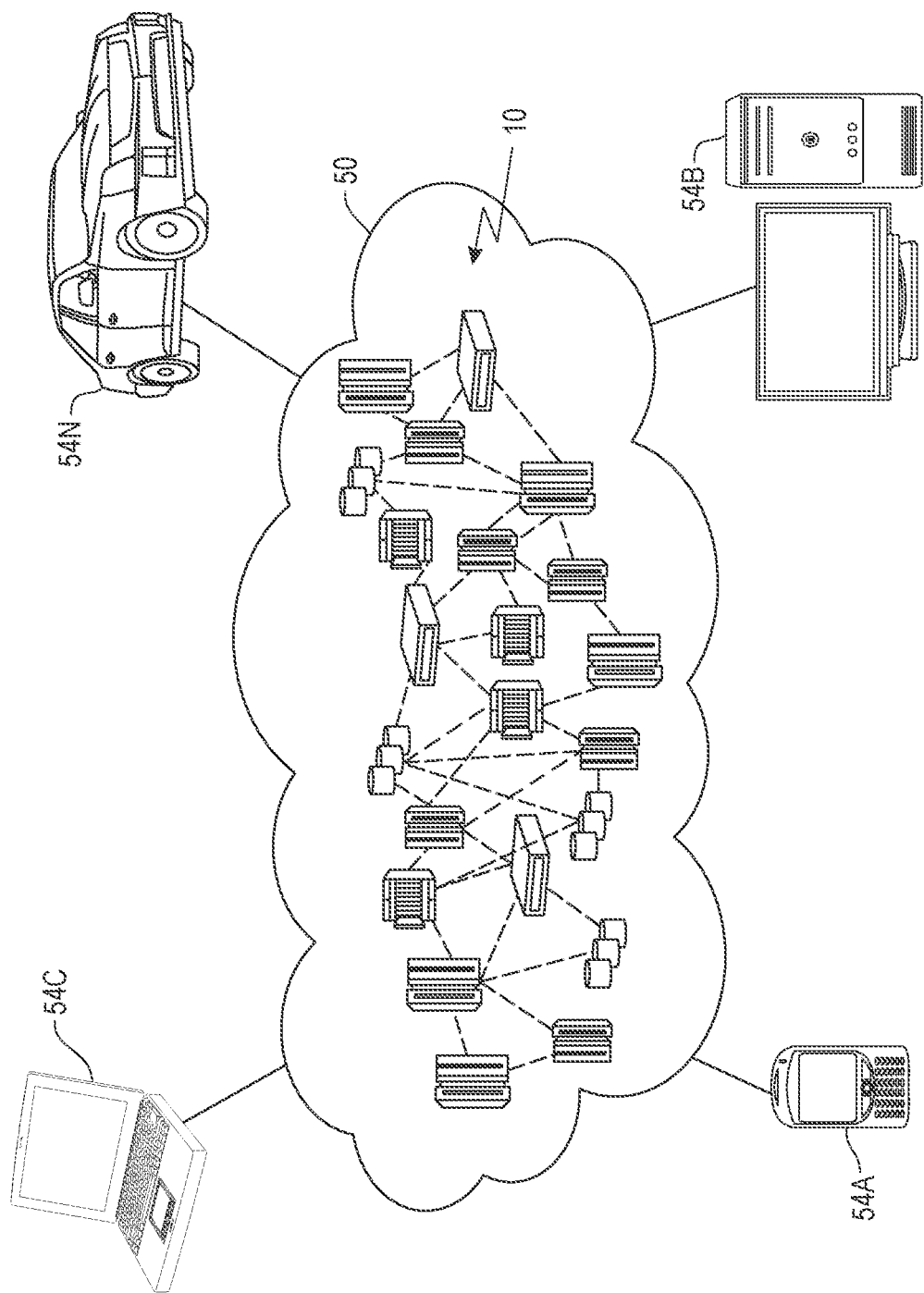
FIG. 1 depicts a cloud computing environment in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several aspects of multi-key encryption data deduplication.

In one general aspect, a computer-implemented method includes sending key group information to a storage system. The key group information includes keyID information for client data keys in the key group. The client data keys enable deduplication of data chunks encrypted in any of the client data keys in the key group. The method also includes generating deduplication information. The deduplication information includes fingerprints associated with chunks of client data. The method also includes encrypting the data chunks with one of the client data keys, wherein a corresponding decryption key for the encrypted data chunks is not available to the storage system. The method includes sending the deduplication information to the storage system for use in a deduplication process by the storage system and sending the encrypted data chunks to the storage system.

In another general aspect, a system includes a processor; and logic integrated with the processor, executable by the processor, or integrated with and executable by the processor. The logic is configured to perform the foregoing method.

In another general aspect, a computer program product includes one or more computer readable storage media, and program instructions collectively stored on the one or more computer readable storage media, the program instructions include program instructions to perform the foregoing method.

In yet another general aspect, a computer-implemented method includes receiving key group information at a storage system. The key group information includes keyID information for client data keys in the key group. The client data keys enable deduplication of data chunks encrypted in any of the client data keys in the key group. The method includes receiving encrypted client data for storage in the storage system and receiving deduplication information. The deduplication information is accessible to the storage system for performing operations thereon and the deduplication information includes fingerprints associated with chunks of the encrypted client data. The method also include identifying data chunks for deduplication based on the deduplication information and, for data chunks which are not identified for deduplication, requesting client data associated with the data chunks encrypted in one of the client data keys.

In another general aspect, a system includes a processor; and logic integrated with the processor, executable by the processor, or integrated with and executable by the processor. The logic is configured to perform the foregoing method.

It is to be understood that although this disclosure includes a detailed description on cloud computing, implementation of the teachings recited herein are not limited to a cloud computing environment. Rather, aspects of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
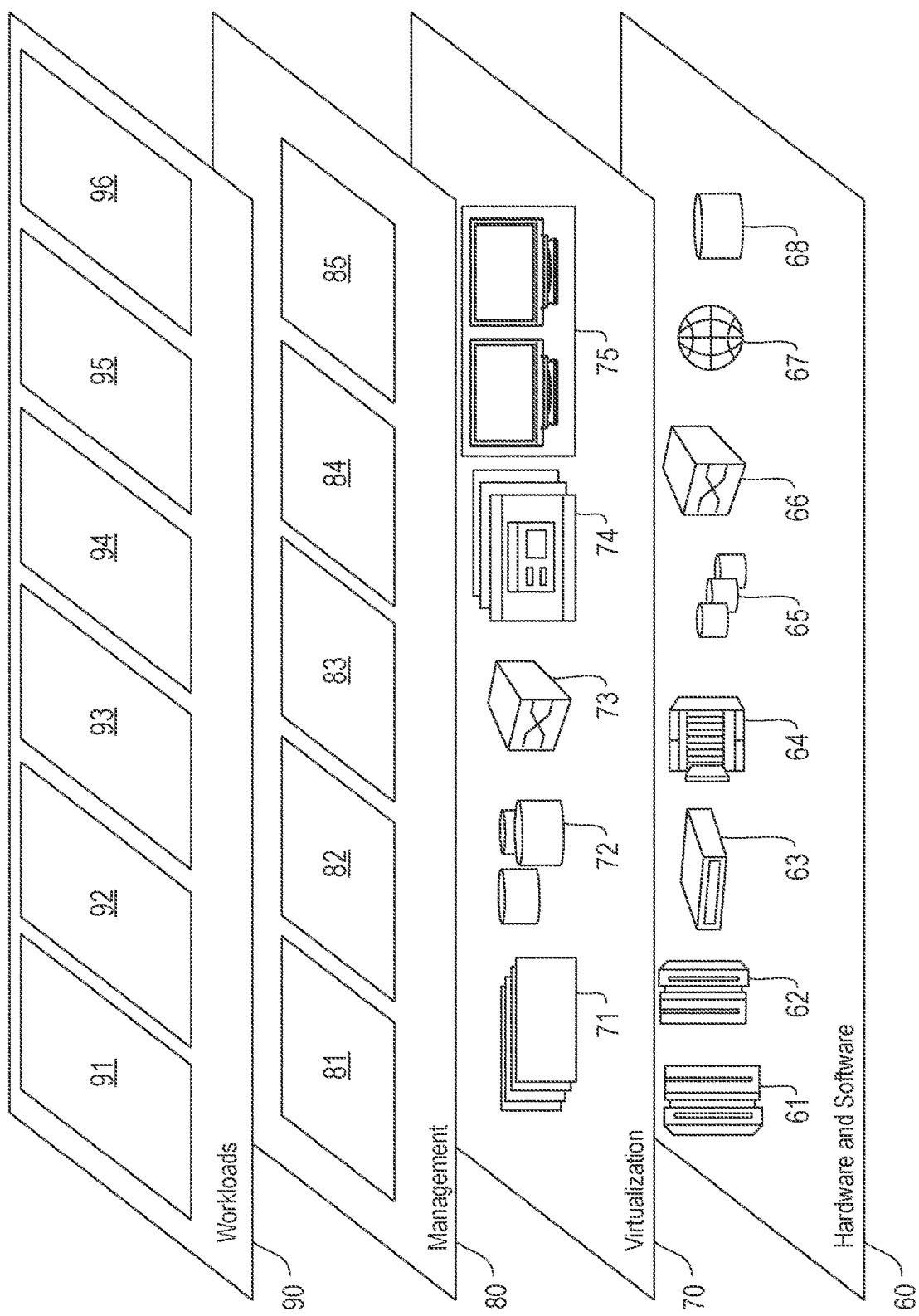
FIG. 2 depicts abstraction model layers in accordance with one aspect of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and aspects of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some aspects, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-key encryption data deduplication 96.

Conventional data reduction techniques, such as deduplication and/or compression, do not provide meaningful reduction when applied to encrypted data. Deduplication of multiple sets of data, each encrypted with a unique encryption key, breaks down where the various encryption algorithms prevent conventional deduplication processes from identifying duplicate data chunks. Conventional data reduction techniques also do not provide adequate data privacy between the client and the storage system.

The keep your own key (KUOK) approach for secure deduplication achieves deduplication of encrypted data without having access to any other client's encryption key.

Data from a client key may be deduped against other data in that key or data in the storage system key. It would be beneficial for a client to possess a set of keys with the ability to dedup across the set of keys while providing secure access to the data. The present disclosure provides a dedup key associated with a set of data keys to enable dedup across data encrypted in any of the set of data keys, without the storage system having access to the keys.

At least some aspects of the present disclosure provide additional abilities to KYOK secure deduplication which allow for a client to use multiple keys to encrypt data. The various aspects improve upon the deduplication of KYOK by increasing the set of data which the dedup is capable of operating on. The various approaches described herein maintain data privacy and improve data privacy compared to conventional encryption and/or deduplication techniques. Various operations for multi-key encryption data deduplication provide relatively better data reduction than conventional full client-side encryption and less client overhead than client-side deduplication.

At least some of the operations described herein may be used with symmetric key encryption and/or asymmetric key encryption (e.g., public key infrastructure (PKI)). It should be understood by one having ordinary skill in the art that PKI encryption may be performed according any configurations known in the art. For example, a public key in PKI is not a secret key, and encrypting data with the public key requires a corresponding secret private key to decrypt. A secret key as referred to throughout the present disclosure refers to a key which is not shared between the client and the storage system.

Clients throughout various aspects of the present disclosure are associated with a set of processes, users, other entities, etc., which have separate data access privileges. For security, each of the foregoing entities has a secret data key for encrypting its data. As used throughout the present disclosure, an entity that has its own secret key is referred to as a key user. The client may desire that data deduplication be allowed across some subsets of the key users. As used throughout the present disclosure, subsets of key users are referred to as key groups. For example, a client may have secret keys k0, k1, k2 . . . k7, wherein keys k0, k1, and k2 form key group 1 (e.g., g1) and secret keys k3, k4, k5, form key group 2 (e.g., g2). Access control may be provided by a client restricting access to key users that are members of the key group as would be understood by one having ordinary skill in the art upon reading the present disclosure. Access control may be provided by restricting access of a key user to a specific key in the key group as would be understood by one having ordinary skill in the art upon reading the present disclosure.

To enable deduplication across the set of keys within a key group, a secret dedup key is provided for each key group to be described in detail below. The secret dedup key is used to encrypt deduped chunks. In some optional approaches, a secret fingerprint key is provided for each key group to be described in detail below. The secret fingerprint key is used to encrypt the dedup metadata prior to sending the dedup metadata and/or deduped chunks to the storage system. The secret fingerprint key need not be available to the key users. Access to the secret dedup key and the secret fingerprint key may be shared among the key users of the associated key group in at least some approaches. This sharing is not a privacy concern since any data encrypted in the dedup key is common data that exists in different secret data keys of the key group as would be understood by one having ordinary skill in the art upon reading the present disclosure. Additionally, as with KYOK deduplication, a keyID associated with each chunk of data may be used to ensure that only data with a matching keyID, including deduped data, is returned for a read request as discussed in further detail below.

Figure 3:
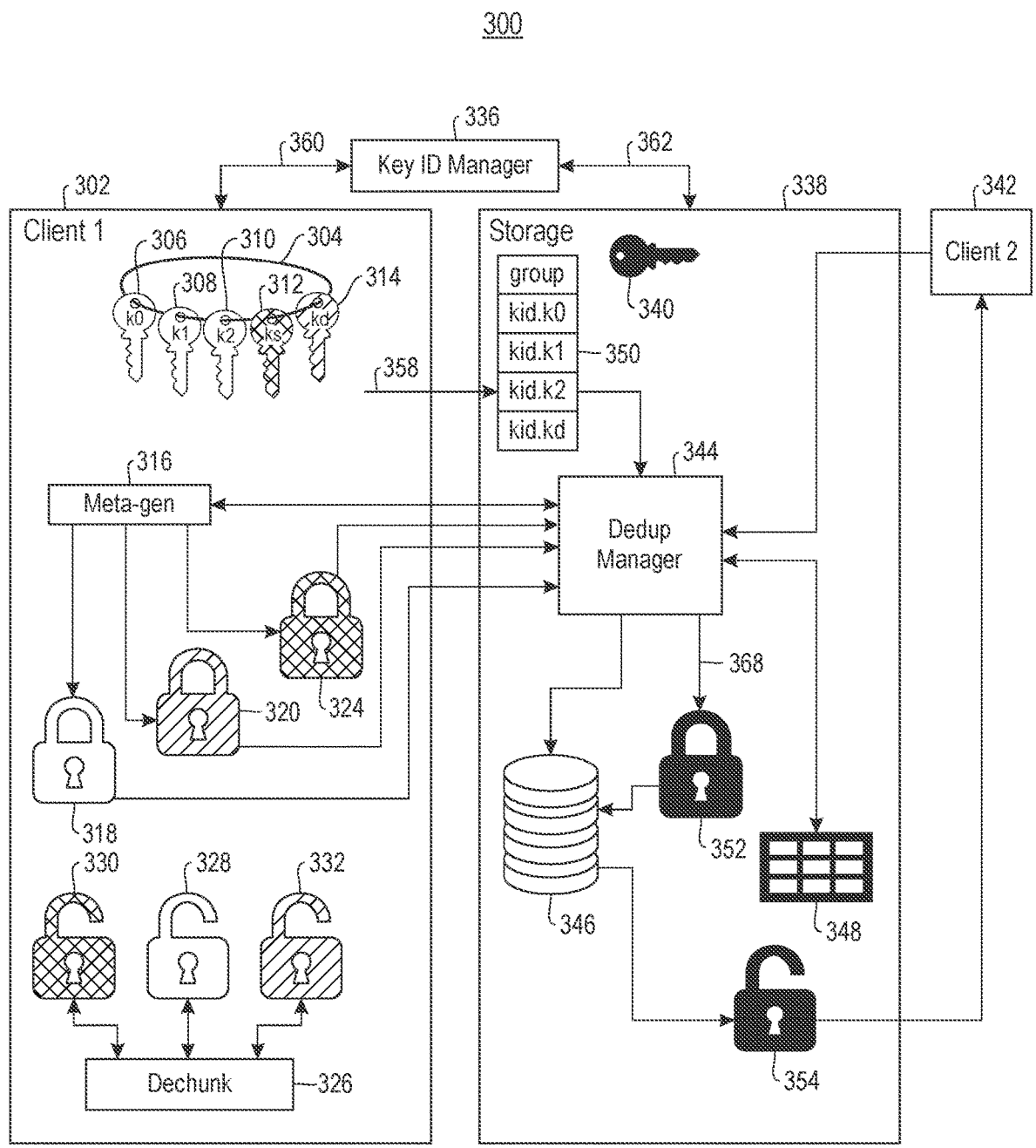
FIG. 3 is a high level architecture, in accordance with one aspect of the present invention.

FIG. 3 depicts a high-level architecture, in accordance with various configurations. The architecture 300 may be implemented in accordance with the present invention in any of the environments depicted in FIGS. 1-2 and 4-11, among others, in various configurations. Of course, more or less elements than those specifically described in FIG. 3 may be included in architecture 300, as would be understood by one of skill in the art upon reading the present descriptions.

Architecture 300 depicts an exemplary implementation of a write operation using a symmetric key encryption. Architecture 300 includes client 1 302. As shown, client 1 302 includes key group 304 including secret data keys: k0 306, k1 308, and k2 310. The secret data keys k0 306, k1 308, and k2 310 may be symmetric keys, asymmetric keys, etc., or any combination thereof. As shown, the secret data keys k0 306, k1 308, and k2 310 are symmetric keys. Key group 304 includes a secret fingerprint key ks 312 and a secret dedup key kd 314.

Client 1 302 comprises a meta-generator 316. In a preferred approach, the meta-generator 316 computes deduplication metadata associated with the data. In various configurations, the meta-generator 316 may be located on the client 1 302 and/or on the storage system 338, or disposed on a network between client 1 302 and storage system 338. In various configurations, a portion of the KYOK function (e.g., metadata generation and/or encryption) may be located on the client, on a network connecting the client to the storage, in a unit attached to the storage system (e.g., where the unit does not provide the storage system with access to client keys or to unencrypted data), etc.

Preferably, the storage system does not have access to the client keys and/or unencrypted data. Various encryption operations, to be described in detail below, are performed after the meta-generator 316 generates the metadata. In a configuration where the meta-generator 316 is located on the storage system 338, the meta-generator 316 is encapsulated such that the client keys and the unencrypted data are not revealed to the storage system 338. The meta-generator 316 may be encapsulated in any manner known in the art including via hardware (e.g., a smartNIC), a trusted compute environment, etc.

In a preferred approach, the meta-generator 316 performs metadata operations on data on the client 1 302 and identifies data deduplication opportunities in the data. The meta-generator 316 identifies data deduplication opportunities using any data deduplication techniques known in the art. In one aspect, the meta-generator 316 uses fixed block deduplication. In another aspect, the meta-generator 316 uses full object deduplication, etc. In yet another aspect, the meta-generator 316 uses a sliding window variable chunk deduplication technique to identify data deduplication opportunities. The meta-generator 316 identifies and/or calculates deduplication fingerprints (e.g., rolling min hashes, cryptographic hashes, etc.). The meta-generator 316 generates metadata associated with the data deduplication opportunities (e.g., deduplication information) including pointers, chunk lengths, chunk fingerprints, etc. Portions of the data deduplication information, such as the chunk fingerprints, may be encrypted with the client secret fingerprint key ks 312 as discussed in detail below. In one approach, the meta-generator 316 compresses data using any data compression technique known in the art. In some approaches, various compression techniques may be applied before and/or after chunking. In one configuration, pre-chunking compression may be a type of compression which improves the performance of the chunking. In another configuration, post-chunking compression may be tuned towards minimizing the resulting chunk size.

Fingerprint computation may be performed on the data chunk before and/or after compression. Pre-compression fingerprint computations allow the fingerprints to be verified after decompression on read. Post-compression fingerprint computations allow the fingerprints to be checked while the chunk is in a compressed state.

Client 1 302 comprises a secret data key encrypter 318. The secret data key encrypter 318 may encrypt data with a secret data key (e.g., k0 306, k1 308, and k2 310) as would be understood by one having ordinary skill in the art upon reading the present disclosure.

Client 1 302 comprises a secret dedup key encrypter 320. The secret dedup key encrypter 320 may encrypt data with the secret dedup key kd 314 as would be understood by one having ordinary skill in the art upon reading the present disclosure.

Client 1 302 comprises a secret fingerprint key encrypter 324. The secret fingerprint key encrypter 324 may encrypt fingerprints with the secret fingerprint key ks 312 as would be understood by one having ordinary skill in the art upon reading the present disclosure. In an alternative approach, the secret fingerprint key and the secret dedup key may be the same key. In the foregoing alternative approach, the secret fingerprint key encrypter may encrypt data and/or fingerprints with the secret fingerprint key as would be understood by one having ordinary skill in the art upon reading the present disclosure.

Client 1 302 comprises a dechunker 326. In various configurations, the dechunker 326 may be located on the client 1 302 and/or on the storage system 338, or disposed on a network between client 1 302 and storage system 338. In various configurations, the dechunker (e.g., including the functionality associated therewith) may be located on the client, on a network connecting the client to the storage, in a unit attached to the storage system (e.g., where the unit does not provide the storage system with access to client keys or to unencrypted data), etc.

Preferably, the storage system does not have access to the client keys and/or unencrypted data. In a configuration where the dechunker 326 is located on the storage system 338, the dechunker 326 is encapsulated such that the client keys and the unencrypted data are not revealed to the storage system 338. The dechunker 326 may be encapsulated in any manner known in the art including via hardware (e.g., a smartNIC), a trusted compute environment, etc.

The dechunker 326 may dechunk data chunks received from the storage system where the data chunks are encrypted with multiple encryption keys. In a preferred approach, data chunks which are encrypted with multiple encryption keys refers to instances where at least some data chunks are encrypted with a first key and at least some other data chunks are encrypted with a second key wherein the first key and second key are different keys. Data chunks encrypted with multiple encryption keys should not be interpreted as data chunks which are subject to multiple client secret encryption keys serially and/or simultaneously unless expressly disclosed herein.

The dechunker 326 may identify which encryption key a data chunk is encrypted with and decrypt the data chunk with the corresponding decrypter (e.g., the secret data key decrypter 328, the secret fingerprint key decrypter 330, the secret dedup key decrypter 332, etc.). Each decrypter may decrypt data with a corresponding key as would be understood by one having ordinary skill in the art upon reading the present disclosure.

Architecture 300 optionally includes a keyID manager 336. The keyID manager 336 stores and/or manages the keys and any associated keyIDs in any manner known in that art as would be understood by one having ordinary skill in the art upon reading the present disclosure.

Architecture 300 includes a storage system 338. The storage system 338 may be any type of storage system known in the art. It should be understood by one having ordinary skill in the art that the storage system 338 may have more or less components than those listed herein. The storage system 338 preferably performs various deduplication operations described herein.

Storage system 338 comprises a secret storage encryption key 340. In a preferred approach, the secret storage encryption key 340 never leaves the storage system 338. In this preferred approach, the secret storage encryption key 340 is not shared with the client 1 302, client 2 342, any other clients, any other storage systems, etc. The secret storage encryption key 340 may be a symmetric key, an asymmetric key, etc. As shown, the secret storage encryption key 340 is a symmetric key. The secret storage encryption key 340 may optionally be used to encrypt client data, data chunks, chunk fingerprints, etc., received from the client as would be understood by one having ordinary skill in the art.

Storage system 338 comprises a deduplication manager 344. The deduplication manager 344 locates and/or identifies duplicate data based on the deduplication information provided by client 1 302. For a chunking deduplication, the deduplication information is used with the chunk metadata to identify data chunks which are duplicates. The deduplication manager 344 performs any associated deduplication operations as would be understood by one having ordinary skill in the art upon reading the present disclosure. Any known deduplication techniques may be used to deduplicate the data chunks.

Storage system 338 comprises chunk storage 346. The chunk storage 346 may comprise any storage components known in the art. The chunk storage 346 may store data chunks, deduplicated data, non-deduplicated data, encrypted data, unencrypted data, deduplication information, etc., in any manner known in the art. In one approach, the chunk storage 346 stores data chunks, deduplicated data, non-deduplicated data, encrypted data, unencrypted data, deduplication information, etc., in a table.

Storage system 338 comprises chunk metadata in storage 348. Storage 348 may comprise any storage components known in the art. The storage 348 may store chunk metadata, data chunks, deduplicated data, non-deduplicated data, encrypted data, unencrypted data, deduplication information, etc., in any manner known in the art. The chunk metadata may comprise any metadata associated with the non-deduplicated and/or deduplicated data chunks including pointers, chunk lengths, chunk fingerprints, etc. The chunk metadata may be updated in response to receiving new data from the deduplication manager 344.

Storage system 338 comprises a keyID list 350. The keyID list 350 includes a list of keyIDs associated with the set of secret data keys (e.g., k0 306, k1 308, and k2 310) used by client 1 302 to encrypt data.

Storage system 338 comprises a secret storage key encrypter 352. The secret storage key encrypter 352 may optionally encrypt data with the secret storage encryption key 340 as would be understood by one having ordinary skill in the art upon reading the present disclosure.

Storage system 338 comprises a secret storage key decrypter 354. The secret storage key decrypter 354 may decrypt data encrypted with the secret storage encryption key 340 as would be understood by one having ordinary skill in the art upon reading the present disclosure.

Client 1 302 secret data keys (e.g., k0 306, k1 308, and k2 310) are not shared with storage system 338 and the secret storage encryption key 340 is not shared with any client. The clients and/or the storage system may choose to use a key manager (see optional keyID manager 336) and/or any additional means to store and/or manage their keys.

Architecture 300 includes client 2 342. As shown, client 2 342 uses at-rest encryption storage and sends unencrypted data (e.g., non-private data) to the storage system 338. Client 2 342 may send unencrypted data because client 2 342 does not have any data privacy concerns in at least some approaches. Unencrypted data may refer to data which the storage system receives in the clear. In various approaches, any communication encryption known in the art may be implemented between the various components. Any communication encryption between at least some of the various components may be implemented according to methods known in the art.

Prior to writing data, client 1 302 may issue a request 358 to the storage system 338. The client 1 302 may send client key group information from the keyID list 350 associated with the request 358. The client key group information from the keyID list 350 informs the storage system 338 of the set of keys that the client will use and uniquely identifies each key that the client will use. Client key group information from the keyID list 350 may comprise a client identifier, a group identifier, a tag which indicates if the group allows dedup against cleartext (e.g., unencrypted chunks), a list of keyIDs in the group and any associated key type identifier (e.g., data, dedup, etc.) for each keyID, etc. Client key group information from the keyID list 350 preferably does not include the keys associated with the keyIDs.

In preferred approaches, the keyIDs are not easily predictable and/or determinable from the key itself. A random value and/or a value encrypted in a separate key may be used to generate keyIDs. Any other technique for generating the keyIDs may be used. KeyIDs which are not easily predictable and/or determinable from the key itself prevent unauthorized entities from gaining access to the storage. For example, malware may gain access to a process authorized for a given client secret data keyID. It is beneficial to make it relatively difficult for the process to use the information to deduce other keyID values, thereby limiting the ability to exfiltrate and/or alter data in other keys. KeyIDs may be obtained 360 from the keyID manager 336. The keyID manager 336 may be used to communicate 362 the keyIDs to the storage system 338. The keyID manager 336 may be implemented as software, hardware, a standalone entity, a process on the client 1 302, etc., or any combination thereof.

As part of the request 358, the storage system 338 may verify the identity and access permissions associated with the client 1 302 and the request 358. In one approach, the client 1 302 establishes a session with the storage system 338 via the request 358 to storage system 338.

In one approach, client 1 302 encrypts write data prior to sending the write data to the meta-generator 316. Client 1 302 sends the write data and a keyID indicating the secret data key (e.g., k0 306, k1 308, k2 310) used to encrypt the write data to the meta-generator 316.

In a preferred approach, the meta-generator 316 computes deduplication information (e.g., chunk metadata) associated with the write data. The deduplication information may include operation details of a deduplication method as would be understood by one having ordinary skill in the art upon reading the present disclosure. In one configuration, for a chunking dedup, the deduplication information may include chunk start locations, chunk lengths, chunk fingerprints, similarity information, etc. In one approach, the chunk fingerprint is a cryptographic hash which may be calculated in any manner known in the art.

In one approach, the write data is compressed by the meta-generator 316. Any form of compression known in the art may be used. In some aspects, the write data may be sent in response to request from the storage system 338 (to be discussed in detail below). In response to the request, the compressed data may be sent to the secret data key encrypter 318 and encrypted with an appropriate secret data key from the key group 304. The secret data key encrypted data and the keyID associated with the secret data key from the key group 304 may be sent to the storage system 338 (e.g., the deduplication manager 344 on the storage system 338).

In at least some approaches, the write data is sent to the secret fingerprint key encrypter 324 and the corresponding fingerprints are encrypted with the secret fingerprint key ks 312. The write data and the keyID associated with the secret fingerprint key ks 312 may be sent to the storage system 338 (e.g., the deduplication manager 344 on the storage system 338).

In yet another approach, the write data may be sent in response to request from the storage system 338 (to be discussed in detail below). In response to the request, the write data is sent to the secret dedup key encrypter 320 and encrypted with the secret dedup key kd 314. The write data and the keyID associated with the secret dedup key kd 314 may be sent to the storage system 338 (e.g., the deduplication manager 344).

In any of the foregoing approaches, data is preferably opaque to the storage system 338 (e.g., the data is encrypted with the secret data keys, the secret fingerprint key ks 312, or the secret dedup key kd 314, wherein these keys are not available to the storage system 338). In various approaches, the deduplication information and the write data are tagged and/or otherwise indicated as associated.

The deduplication manager 344 locates and/or identifies duplicate data based on the deduplication information. For a chunking deduplication, the deduplication information is used with the chunk metadata to identify data chunks that are duplicates. For example, the deduplication manager 344 compares the pointers, fingerprints, chunk lengths, etc., from the decrypted deduplication information to any pointers, fingerprints, chunk lengths, etc., stored in the chunk metadata. The deduplication manager 344 performs any associated deduplication operations as would be understood by one having ordinary skill in the art upon reading the present disclosure.

In response to performing the associated deduplication operations, updates may be performed on the chunk metadata. The updates reflect changes due to the use of any deduplicated chunks, adding information relating to any remaining chunks, etc. The chunk metadata includes information on the keyID encrypting a given data chunk. Any remaining data chunks associated with new fingerprints (e.g., non-pre-existing in the chunk metadata) which are not deduplicated are written to the chunk storage 346. Any new, non-deduplicated data chunks are written to the chunk storage 346.

Subsequent data access requests include the keyID associated with the client secret data key used to encrypt the data.

The keyID may be a part of a specific message. The keyID may be part of an established session, process, etc.

Various aspects disclosed in detail below describe the behavior of the foregoing configuration when using a sliding window variable chunk size dedup. Prior to the operations described in detail below, the client may request 358 the key group information from the keyID list 350. Note that the client operations which send unencrypted data may send key group information to the storage system 338. Default information may be assumed for clear data. Note that the group and keyID information may be transferred as part of a session and not necessarily sent for each input/output (TO). It is beneficial for the storage system to encrypt all data 368 stored using the secret storage key encrypter 352, even for data encrypted in a private client key. The foregoing encryption is assumed in the following description.

Figure 4:
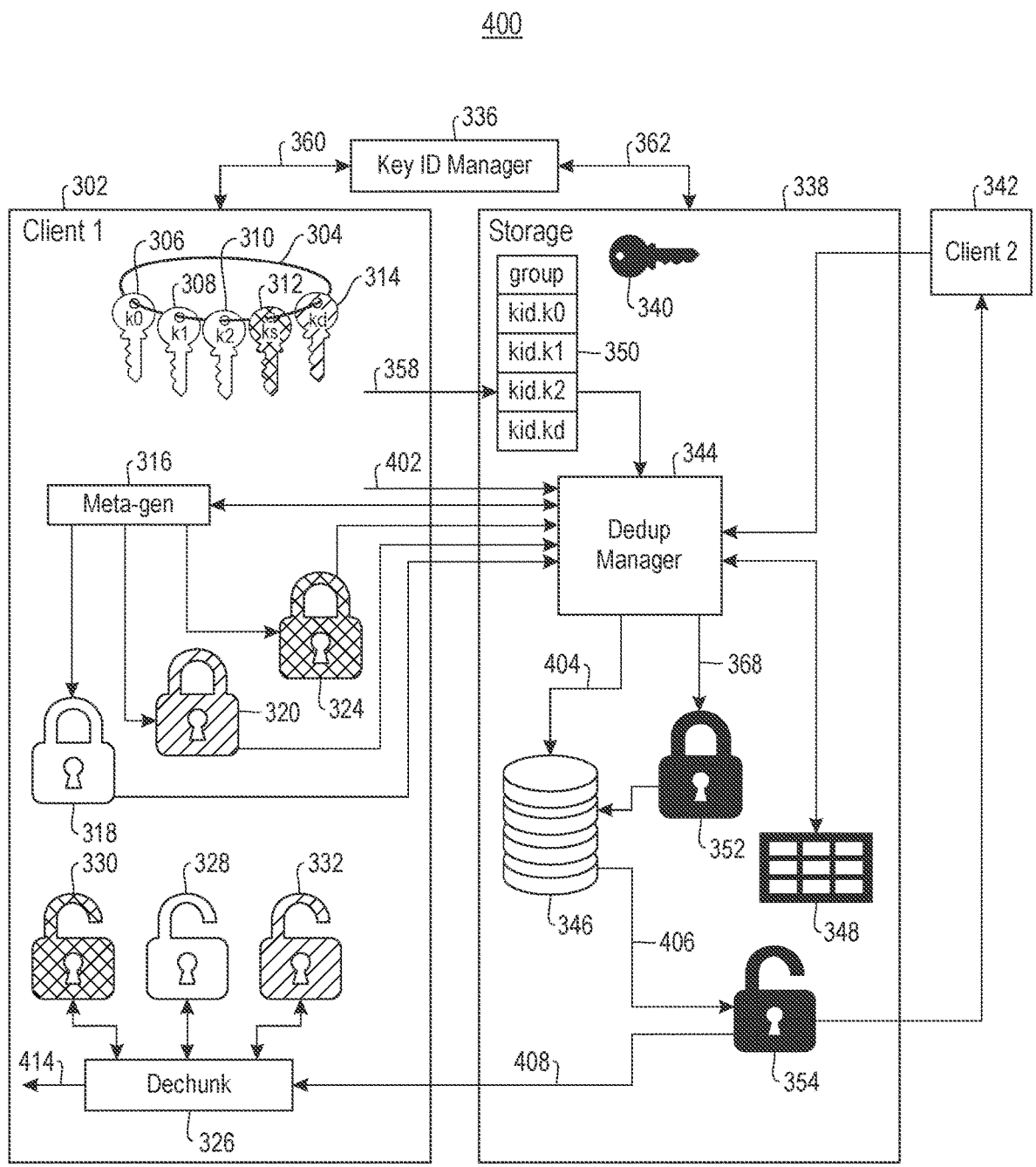
FIG. 4 is a high level architecture, in accordance with one aspect of the present invention.

FIG. 4 depicts a high-level architecture, in accordance with various configurations. The architecture 400 may be implemented in accordance with the present invention in any of the environments depicted in FIGS. 1-3 and 5-11, among others, in various configurations. Of course, more or less elements than those specifically described in FIG. 4 may be included in architecture 400, as would be understood by one of skill in the art upon reading the present descriptions.

Architecture 400 depicts an exemplary implementation of a read operation using a symmetric key encryption. Architecture 400 includes client 1 302. As shown, client 1 302 includes key group 304 including secret data keys: k0 306, k1 308, and k2 310. The secret data keys k0 306, k1 308, and k2 310 may be symmetric keys, asymmetric keys, etc., or any combination thereof. As shown, the secret data keys k0 306, k1 308, and k2 310 are symmetric keys. Key group 304 includes a secret fingerprint key ks 312 and a secret dedup key kd 314.

Client 1 302 comprises a meta-generator 316. In various configurations, the meta-generator 316 may be located on the client 1 302 and/or on the storage system 338, or disposed on a network between client 1 302 and storage system 338. In various configurations, a portion of the KYOK function (e.g., metadata generation and/or encryption) may be located on the client, on a network connecting the client to the storage, in a unit attached to the storage system (e.g., where the unit does not provide the storage system with access to client keys or to unencrypted data), etc.

Preferably, the storage system does not have access to the client keys and/or unencrypted data. Various encryption operations, to be described in detail below, are performed after the meta-generator 316 generates the metadata. In a configuration where the meta-generator 316 is located on the storage system 338, the meta-generator 316 is encapsulated such that the client keys and the unencrypted data are not revealed to the storage system 338. The meta-generator 316 may be encapsulated in any manner known in the art including via hardware (e.g., a smartNIC), a trusted compute environment, etc.

In a preferred approach, the meta-generator 316 computes deduplication metadata associated with the data. In various configurations, the meta-generator 316 may be located on the client 1 302 and/or on the storage system 338.

In a preferred approach, the meta-generator 316 performs metadata operations on data on the client 1 302 and identifies data deduplication opportunities in the data. The meta-generator 316 identifies data deduplication opportunities using any data deduplication techniques known in the art. In one aspect, the meta-generator 316 uses a sliding window variable chunk deduplication technique to identify data deduplication opportunities. The meta-generator 316 identifies and/or calculates deduplication fingerprints (e.g., rolling min hashes, cryptographic hashes, etc.). The meta-generator 316 generates metadata associated with the data deduplication opportunities (e.g., deduplication information) including pointers, chunk lengths, chunk fingerprints, etc. Portions of the data deduplication information, such as the chunk fingerprints, may be encrypted with the client secret fingerprint key ks 312 as discussed in detail below.

In one approach, the meta-generator 316 compresses data using any data compression technique known in the art. In some approaches, various compression techniques may be applied before and/or after chunking. In one configuration, pre-chunking compression may be a type of compression which improves the performance of the chunking. In another configuration, post-chunking compression may be tuned towards minimizing the resulting chunk size.

Fingerprint computation may be performed on the data chunk before and/or after compression. Pre-compression fingerprint computations allow the fingerprints to be verified after decompression on read. Post-compression fingerprint computations allow the fingerprints to be checked while the chunk is in a compressed state.

Client 1 302 comprises a secret data key encrypter 318. The secret data key encrypter 318 may encrypt data with a secret data key (e.g., k0 306, k1 308, and k2 310) as would be understood by one having ordinary skill in the art upon reading the present disclosure.

Client 1 302 comprises a secret dedup key encrypter 320. The secret dedup key encrypter 320 may encrypt data with the secret dedup key kd 314 as would be understood by one having ordinary skill in the art upon reading the present disclosure.

Client 1 302 comprises a secret fingerprint key encrypter 324. The secret fingerprint key encrypter 324 encrypts fingerprints with the secret fingerprint key ks 312 as would be understood by one having ordinary skill in the art upon reading the present disclosure.

Client 1 302 comprises a dechunker 326. In various configurations, the dechunker 326 may be located on the client 1 302 and/or on the storage system 338, or disposed on a network between client 1 302 and storage system 338. In various configurations, the dechunker (e.g., including the functionality associated therewith) may be located on the client, on a network connecting the client to the storage, in a unit attached to the storage system (e.g., where the unit does not provide the storage system with access to client keys or to unencrypted data), etc.

Preferably, the storage system does not have access to the client keys and/or unencrypted data. In a configuration where the dechunker 326 is located on the storage system 338, the dechunker 326 is encapsulated such that the client keys and the unencrypted data are not revealed to the storage system 338. The dechunker 326 may be encapsulated in any manner known in the art including via hardware (e.g., a smartNIC), a trusted compute environment, etc.

The dechunker 326 may dechunk data chunks received from the storage system where the data chunks are encrypted with multiple encryption keys. In a preferred approach, data chunks which are encrypted with multiple encryption keys refer instances where at least some data chunks are encrypted with a first key and at least some other data chunks are encrypted with a second key wherein the first key and second key are different keys. Data chunks encrypted with multiple encryption keys should not be interpreted as data chunks which are subject to multiple client secret encryption keys serially and/or simultaneously unless expressly disclosed herein.

The dechunker 326 may identify which encryption key a data chunk is encrypted with and decrypt the data chunk with the corresponding decrypter (e.g., the secret data key decrypter 328, the secret fingerprint key decrypter 330, the secret dedup key decrypter 332, etc.). Each decrypter may decrypt data with a corresponding key as would be understood by one having ordinary skill in the art upon reading the present disclosure.

Architecture 400 optionally includes a keyID manager 336. The keyID manager 336 stores and/or manages the keys and any associated keyIDs in any manner known in that art as would be understood by one having ordinary skill in the art upon reading the present disclosure.

Architecture 400 includes a storage system 338. The storage system 338 may be any type of storage system known in the art. It should be understood by one having ordinary skill in the art that the storage system 338 may have more or less components than those listed herein. The storage system 338 preferably performs various deduplication operations described herein.

Storage system 338 comprises a secret storage encryption key 340. In a preferred approach, the secret storage encryption key 340 never leaves the storage system 338. In this preferred approach, the secret storage encryption key 340 is not shared with the client 1 302, client 2 342, any other clients, any other storage systems, etc. The secret storage encryption key 340 may be a symmetric key, an asymmetric key, etc. As shown, the secret storage encryption key 340 is a symmetric key.

Storage system 338 comprises a deduplication manager 344. The deduplication manager 344 locates and/or identifies duplicate data based on the deduplication information provided by client 1 302. For a chunking deduplication, the deduplication information is used with the chunk metadata to identify data chunks which are duplicates. The deduplication manager 344 performs any associated deduplication operations as would be understood by one having ordinary skill in the art upon reading the present disclosure. Any known deduplication techniques may be used to deduplicate the data chunks.

Storage system 338 comprises chunk storage 346. The chunk storage 346 may comprise any storage components known in the art. The chunk storage 346 may store data chunks, deduplicated data, non-deduplicated data, encrypted data, unencrypted data, deduplication information, etc., in any manner known in the art. In one approach, the chunk storage 346 stores data chunks, deduplicated data, non-deduplicated data, encrypted data, unencrypted data, deduplication information, etc., in a table.

Storage system 338 comprises chunk metadata stored in storage 348. Storage 348 may comprise any storage components known in the art. The storage 348 may store chunk metadata, data chunks, deduplicated data, non-deduplicated data, encrypted data, unencrypted data, deduplication information, etc., in any manner known in the art. The chunk metadata may comprise any metadata associated with the non-deduplicated and/or deduplicated data chunks including pointers, chunk lengths, chunk fingerprints, etc. The chunk metadata may be updated in response to receiving new data from the deduplication manager 344.

Storage system 338 comprises a keyID list 350. The keyID list 350 includes a list of keyIDs associated with the set of secret data keys (e.g., k0 306, k1 308, and k2 310) used by client 1 302 to encrypt data.

Storage system 338 comprises a secret storage key encrypter 352. The secret storage key encrypter 352 may optionally encrypt data with the secret storage encryption key 340 as would be understood by one having ordinary skill in the art upon reading the present disclosure.

Storage system 338 comprises a secret storage key decrypter 354. The secret storage key decrypter 354 may decrypt data encrypted with the secret storage encryption key 340 as would be understood by one having ordinary skill in the art upon reading the present disclosure.

Client 1 302 secret data keys (e.g., k0 306, k1 308, and k2 310) are not shared with storage system 338 and the secret storage encryption key 340 is not shared with any client. The clients and/or the storage system may choose to use a key manager (see optional keyID manager 336) and/or any additional means to store and/or manage their keys.

Architecture 400 includes client 2 342. As shown, client 2 342 uses at-rest encryption storage and sends unencrypted data (e.g., non-private data) to the storage system 338. Client 2 342 may send unencrypted data because client 2 342 does not have any data privacy concerns in at least some approaches. Unencrypted data may refer to data which the storage system receives in the clear. In various approaches, any communication encryption known in the art may be implemented between the various components. Any communication encryption between at least some of the various components may be implemented according to methods known in the art.

Prior to reading data, client 1 302 may issue a request 358 to the storage system 338. In preferred approaches, the request 358 includes a request for key group information from the keyID list 350 associated with the request 358. The client key group information from the keyID list 350 informs the storage system 338 of the set of keys that the client will use and uniquely identifies each key that the client will use. Client key group information from the keyID list 350 may comprise a client identifier, a group identifier, a tag which indicates if the group allows dedup against cleartext (e.g., unencrypted chunks), a list of keyIDs in the group and any associated key type identifier (e.g., data, dedup, etc.) for each keyID, etc. Client key group information from the keyID list 350 preferably does not include the keys associated with the keyIDs.

Client 1 302 sends a read request 402 to the storage system 338, including the keyID value associated with the read data. Authorization for a read request 402 may require a non-zero reference count for each chunk comprising the read request 402 in some approaches.

The deduplication manager 344 retrieves information associated with the chunks which are associated with the read request 402 using chunk metadata associated with chunk storage 346 (e.g., metadata storage). Chunk metadata includes the keyID for the key used to encrypt each chunk, the reference counts, locations, any other chunk information, etc., or any combination thereof. At operation 404, the deduplication manager 344 requests the appropriate set of chunks from the chunk storage 346 on the storage system 338. Each chunk and associated metadata (e.g., including the keyID for each chunk) are sent 406 to the secret storage key decrypter 354. Each chunk and associated metadata (e.g., including the keyID for each chunk) are sent 408 to the dechunker 326. The dechunker 326 examines the keyID for each chunk. The dechunker 326 decrypts each chunk with the appropriate decrypter for the key associated with the keyID (e.g., the secret data key decrypter 328, the secret dedup key decrypter 332, no decrypter for cleartext keyIDs, etc.). Each decrypter may decrypt data with a corresponding key as would be understood by one having ordinary skill in the art upon reading the present disclosure.

Dechunker 326 performs any necessary decompression and merges the chunks to produce output data 414 for client 1 302. The client 1 302 decrypters (e.g., the secret fingerprint key decrypter 330, the secret data key decrypter 328, the secret dedup key decrypter 332, etc.) may be provided by the client 1 302, separate from the dechunker 326, as a means of keeping the client key private in some approaches. The decrypters (e.g., the secret fingerprint key decrypter 330, the secret data key decrypter 328, the secret dedup key decrypter 332, etc.) may be separate components (as shown) and/or at least two decrypters may be a single unit with the associated decryption key provided appropriately for each chunk as would be understood by one having ordinary skill in the art.

In various operations, the deduplication manager 344 identifies data chunks associated with the read request 402 using chunk metadata. The identified data chunks are read from the chunk storage 346. The deduplication manager 344 compares the pointers, fingerprints, chunk lengths, etc., from the read request 402 to any pointers, fingerprints, chunk lengths, etc., stored in the chunk metadata. In a preferred approach, the chunk metadata includes an identifier for the key (e.g., the keyID) used to encrypt each data chunk. Encrypted data chunks are decrypted with the appropriate decrypter as would be understood by one having ordinary skill in the art upon reading the present disclosure. For example, data chunks that are encrypted with the secret storage encryption key 340 may be sent to the secret storage key decrypter 354. The secret storage key decrypter 354 may decrypt data encrypted with the secret storage encryption key 340.

The dechunker 326 may dechunk data chunks received from the storage system where the data chunks are encrypted with multiple encryption keys. In a preferred approach, data chunks which are encrypted with multiple encryption keys refers to instances where at least some data chunks are encrypted with a first key and at least some other data chunks are encrypted with a second key wherein the first key and second key are different keys. Data chunks encrypted with multiple encryption keys should not be interpreted as data chunks which are subject to multiple client secret encryption keys serially and/or simultaneously unless expressly disclosed herein. The dechunker 326 may identify which encryption key a data chunk is encrypted with and decrypt the data chunk using the corresponding decrypter (e.g., the secret fingerprint key decrypter 330, the secret data key decrypter 328, the secret dedup key decrypter 332, etc.). Each decrypter may decrypt data chunks encrypted with a corresponding key as would be understood by one having ordinary skill in the art upon reading the present disclosure.

In various approaches, the dechunker 326 performs any decompression operations known in the art. The dechunker 326 may merge the data chunks to produce output data 414 for the client 1 302.

The decrypters may be provided by the client 1 302 separate from the dechunker 326 to keep the various secret keys secret as would be understood by one having ordinary skill in the art upon reading the present disclosure.

Encrypted data chunks with the client key sent 408 from the storage system 338 may comprise data chunk metadata including chunk fingerprints to verify that each chunk is correctly delivered and decrypted with the proper key. The data chunk metadata may provide an end-to-end check.

In preferred configurations of architecture 400, various compression and/or deduplication techniques may be performed without the secret keys ever leaving the client 1 302.

The secret keys not available to the storage system 338, client 2 342, any other clients, any third party service, any other storage systems, etc. A portion of the deduplication process is preferably performed on the client side (e.g., the chunking process in architecture 400) which significantly reduces or eliminates outside visibility of the secret keys.

In preferred approaches, communications between the clients and the storage system may be encrypted, using any encryption scheme known in the art. For example, the encryption scheme may be a standard transport encryption (e.g., transport layer security (TLS)).

In preferred approaches, in contrast to conventional deduplication operations, additional chunk metadata is associated with each data chunk to indicate the key in which a chunk is encrypted. Different clients may have data chunks that are the same (e.g., duplicates with identical fingerprints). However, if the duplicate data chunks from different clients are encrypted with different keys, conventional deduplication of a first client's data chunk against a second client's data chunk requires sharing a key. In stark contrast, various configurations of the present disclosure provide a chunk identifier comprising information identifying the key used to encrypt the data chunk, an index, a tag, a fingerprint, a keyID, etc. Information on the keyID may be provided by the client 1 302 to the storage system 338 prior to any input/output (I/O) operations.

In the context of data privacy, the keyID is not the key itself. For example, the keyID provided may be a cryptographic hash, such as SHA256 of a secret data key of the key group 304. In another example, the keyID may be a unique index number for a secret data key of the key group 304. Storage system 338 may create an internal reference keyID. For example, the storage system 338 may create an index table of keyIDs (e.g., the keyID list 350).

Chunk metadata may include a reference counter in various approaches to indicate how many different pieces of data point to the data chunk. Metadata may be added to each data chunk which indicates the source keyID and a reference count for each keyID. An attempt to read a chunk without a non-zero reference count for the request keyID may be intercepted. This interception provides access control for the deduplicated data chunks. For example, client 1 302 using the keyID associated with secret data key k1 308 may have data which includes a deduped chunk A. Chunk A may be the only piece of data encrypted with secret data key k1 308 that deduped to chunk A. Client 1 302 may delete the data which includes deduplicated chunk A. The reference counter for the client 1 302 keyID associated with secret data key k1 308 is decremented to 0. Any subsequent attempt to read chunk A with the keyID associated with client 1 302 secret data key k1 308 may be blocked and any requests with a non-zero associated reference count may be allowed.

If data encrypted with a secret data key from the key group 304 does not dedup initially, the data may be deduped in response to a data chunk encrypted with the secret storage encryption key 340 with a matching fingerprint being written and/or an unencrypted data chunk being written. The process for deduping an initially non-deduplicated data chunk may be referred to as backporting in various configurations described herein. A backport operation comprises a deduplication operation which stores a new data chunk (e.g., encrypted with a key that is available to the storage system 338). Specifically, the original chunk was written in a secret data key and backporting stores the new chunk which would normally be written in the secret dedup key of the same key group. The new chunk is only written in a key known to the storage if the flag allowing dedup to cleartext is on, and the new chunk is written (e.g., sent to storage system 338) in the clear, and the storage system encrypts data at rest in its own secret storage encryption key 340.

The backport comprises deleting any pre-existing chunks with a matching fingerprint but a different keyID. The metadata for the stored and/or deleted data chunks may be converted to point at the new data chunk (e.g., as if the new data chunk existed first). The order in which data chunks are written in different keys does not affect the final deduplication efficiency. Any subsequent at-rest and/or unencrypted write of a copy of the data chunk decreases the stored capacity on the system using the backporting technique described herein where many private copies of a data chunk exist.

Various configurations described herein may be achieved using asymmetric encryption keys (e.g., PKI). Symmetric key encryption may be preferred over asymmetric key encryption for relatively large data sets. Asymmetric key encryption comprises a client having a public key, which is shared with the storage system, and a private key, which is not shared with the storage system. The storage system may have both a public key, which is shared with the client(s), and a private key, which is not shared with the client(s). A public key in PKI is not secret, but encrypting data in the public key requires a corresponding secret private key to decrypt the data.

Figure 5:
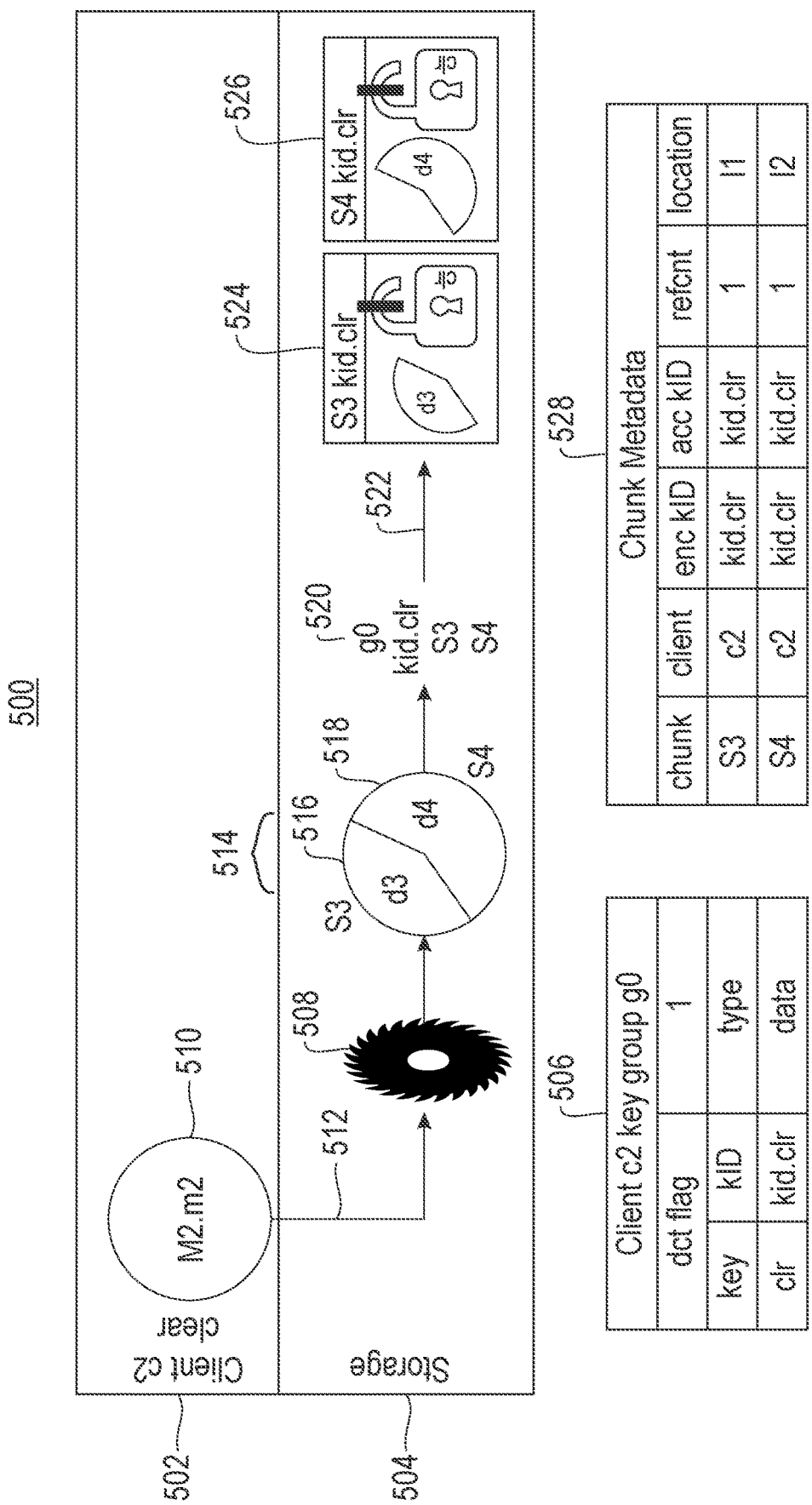
FIG. 5 is a high level architecture, in accordance with one aspect of the present invention.

FIG. 5 depicts a high-level architecture, in accordance with various configurations. The architecture 500 may be implemented in accordance with the present invention in any of the environments depicted in FIGS. 1-4 and 6-11, among others, in various configurations. Of course, more or less elements than those specifically described in FIG. 5 may be included in architecture 500, as would be understood by one of skill in the art upon reading the present descriptions.

Architecture 500 depicts an exemplary implementation of writing data in the clear from client c2 502 to storage 504. Architecture 500 includes client c2 key group g0 information 506. Client c2 key group g0 information 506 comprises a dct (dedup cleartext) flag. The dct flag is set to 1 to indicate that dedup to cleartext is allowed. The only key in the key group is clr (clear), which indicates no encryption is used in the present configuration. The standard keyID of kid.clr is used to indicate the data is not encrypted. For example, a keyID value of 0 may be reserved as kid.clr such that all clients have the same clear keyID. Keys are not sent to the storage 504 as part of the group information sent to the storage 504 (sending operation not shown).

Storage 504 includes meta-generator 508. Meta-generator 508 performs in a manner similar to the meta-generator 316 described in detail above with reference to FIGS. 3-4. In other approaches, the meta-generator 508 is located at client c2 502.

Client c2 502 writes data object M2 510 with data m2. Operation 512 includes sending the data object M2 510 with data m2 to the meta-generator 508 on the storage 504. The meta-generator 508 identifies 2 data chunks 514 as shown (e.g., data chunk d3 516 and data chunk d4 518). Data chunk d3 516 is associated with fingerprint S3 and data d3. Data chunk d4 518 is associated with fingerprint S4 and data d4. The fingerprints may include the chunk length of each respective data chunk in various approaches as described in detail above. Metadata 520 includes the key group identifier g0 and keyID kid.clr indicating that the data is in the clear. The data chunks are stored in operation 522. Operations 524 stores the data chunk d3 516 with fingerprint S3 in kid.clr (e.g., stored in cleartext) with associated data d3. Operation 526 stores the data chunk d4 518 with fingerprint S4 in kid.clr (e.g., stored in cleartext) with associated data d4.

Table 528 includes the dedup keyID list metadata associated with each of the chunks, assuming none of the chunks is deduped at this point. The first row of the table 528 shows that data chunk d3 516 having fingerprint S3 is owned by client c2 502. The first row of the table 528 shows that data chunk d3 516 having fingerprint S3 is encrypted in kid.clr (e.g., the data chunk is cleartext) and is accessible only by using the kid.clr keyID. The table 528 shows the data chunk d3 516 having fingerprint S3 has a reference count of 1 and that the data chunk d3 516 having fingerprint S3 is stored at location 11. The second row of the table 528 shows corresponding information with respect to data chunk d4 518 having fingerprint S4 which is stored at location 12.

Figure 6:
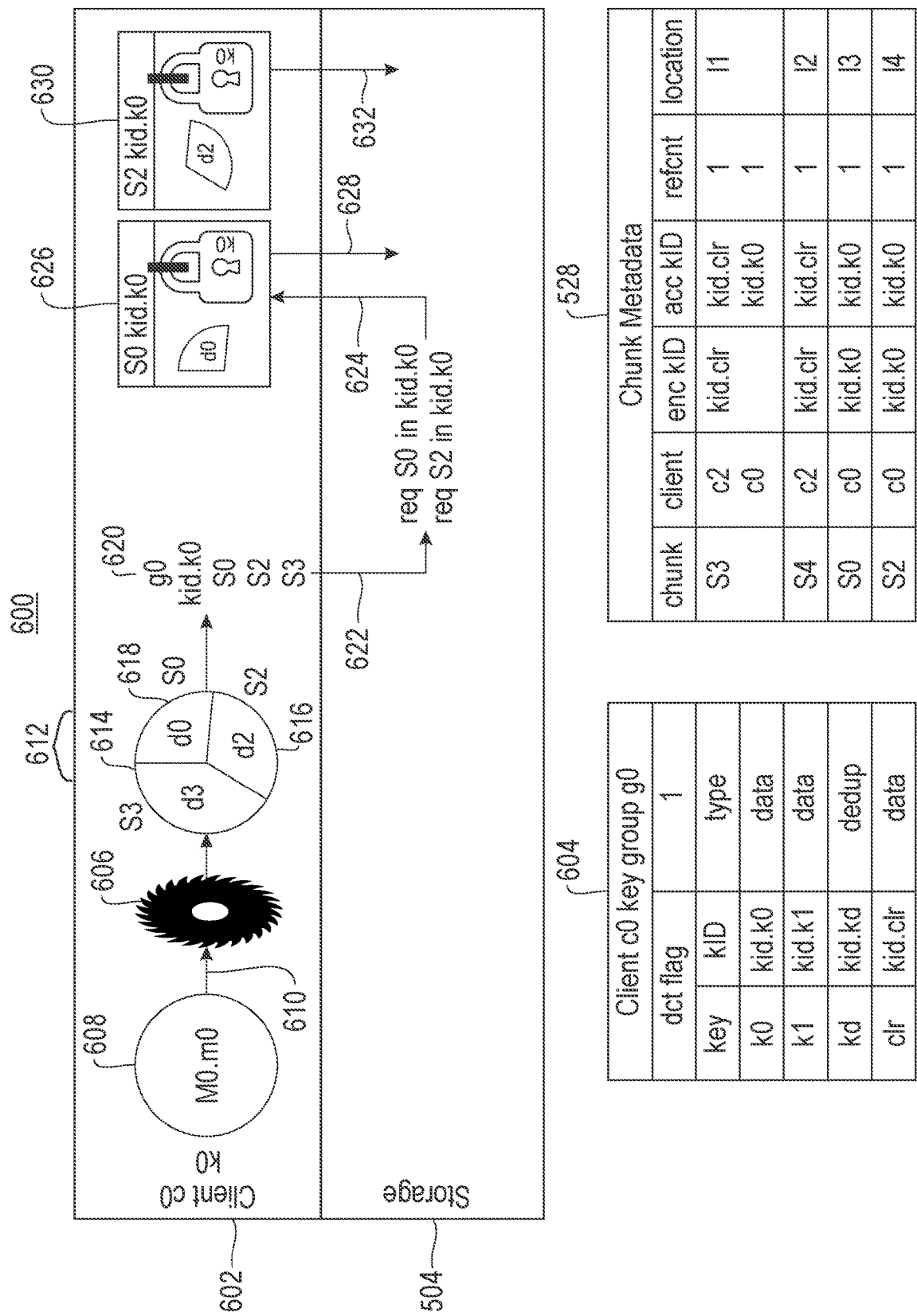
FIG. 6 is a high level architecture, in accordance with one aspect of the present invention.

FIG. 6 depicts a high-level architecture, in accordance with various configurations. The architecture 600 may be implemented in accordance with the present invention in any of the environments depicted in FIGS. 1-5 and 7-11, among others, in various configurations. Of course, more or less elements than those specifically described in FIG. 6 may be included in architecture 600, as would be understood by one of skill in the art upon reading the present descriptions.

Architecture 600 depicts an exemplary implementation of the addition of further data by client c0 602 in key k0 to the storage 504. Client c0 key group g0 information 604 comprises the dct flag (dedup to cleartext) set to 1 to indicate that dedup to data written in keyIDs belonging to group g0 in addition to data written in cleartext is allowed. Specifically, the dct=1 flag allows dedup against cleartext. Client c0 key group g0 information 604 shows that key group g0 includes data key k0 and data key k1 with respective keyIDs kid.k0 and kid.k1. Client c0 key group g0 information 604 includes dedup key kd with keyID kid.kd. Client c0 key group g0 information 604 includes the cleartext data key clr with the associated keyID kid.clr as discussed above. The dct is equal to 1 to indicate that cleartext dedup is allowed and the fingerprints are not encrypted in a fingerprint key.

Where the data is encrypted, meta-generator 606 resides in the client c0 602. Meta-generator 606 is analogous to meta-generator 316 described in detail above with reference to FIGS. 3-4.

Client c0 602 writes data object M0 608 with data m0. Operation 610 includes sending the data object M0 608 with data m0 to the meta-generator 606. The meta-generator 606 identifies 3 data chunks 612 as shown (e.g., data chunk d3 614, data chunk d2 616 and data chunk d0 618). Data chunk d3 614 is associated with fingerprint S3 and data d3. Data chunk d2 616 is associated with fingerprint S2 and data d2. Data chunk d0 618 is associated with fingerprint S0 and data d0. The fingerprints may include the chunk length of each respective data chunk in various approaches as described in detail above. Metadata 620 includes the key group identifier g0 and keyID kid.k0 indicating that the data is encrypted with the secret key associated with keyID kid.k0. Operation 622 includes sending fingerprints S0, S2, and S3 to storage 504. The key group identifier g0 allows storage 504 to ascertain that the dedup keyID is kid.kd from the group information previously transferred (e.g., client c0 key group g0 information 604, see also request 358 with reference to FIGS. 3-4). The key group identifier g0 allows storage 504 to ascertain that dedup against cleartext data is allowed for the client c0 602 of group g0.

Storage 504 examines the current chunk metadata table 528 (see FIG. 5) to determine that S0 and S2 are new fingerprints. Storage 504 examines the chunk metadata table 528 to determine that S3 already exists in kid.clr. Since client c0 602 group g0 allows cleartext dedup and kid.clr is available to all clients (e.g., kid.clr indicates cleartext), chunk S3 (e.g., data chunk d3 614) may be deduplicated.

Storage 504 may request 624 that client c0 602 send chunk S0 (e.g., data chunk d0 618) in kid.k0 and chunk S2 (e.g., data chunk d2 616) in kid.k0. Storage 504 does not request chunk S3. Client c0 602 encrypts 626 data chunk d0 in key k0 and sends 628 the encrypted chunk with the metadata (e.g., including the fingerprint S0 and keyID kid.k0) to storage 504. Similarly, after encrypting 630 data chunk d2, chunk S2 is sent 632 to storage 504. Storage 504 stores the chunks and updates the chunk metadata table 528. Row 1 of the table 528 shows the update for S3 to include information that the chunk was also written by client c0 602 in kid.k0 and has a reference count of 1 in this keyID but leaves the encryption keyID as kid.clr. S3 may be accessed either by using kid.clr or kid.k0. Row 3 of the table 528 includes the new metadata, indicating the chunk S0 was written by client c0 602 encrypted in the secret key associated with keyID kid.k0, is accessible with kid.k0, has a reference count of 1 in this keyID and is stored in location 13. Row 4 of the table 528 shows similar information for chunk S2 which is stored in location 14.

Figure 7:
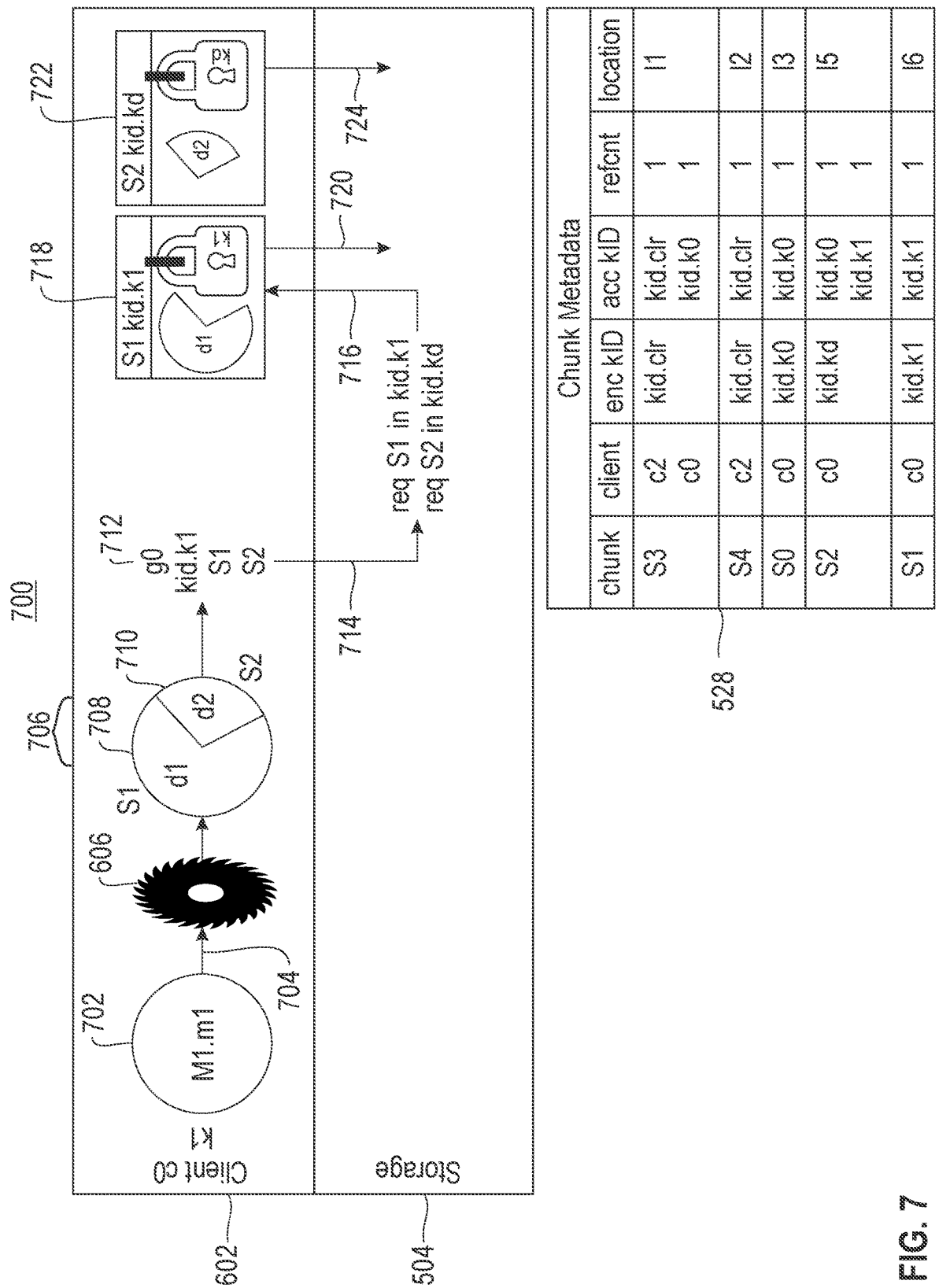
FIG. 7 is a high level architecture, in accordance with one aspect of the present invention.

FIG. 7 depicts a high-level architecture, in accordance with various configurations. The architecture 700 may be implemented in accordance with the present invention in any of the environments depicted in FIGS. 1-6 and 8-11, among others, in various configurations. Of course, more or less elements than those specifically described in FIG. 7 may be included in architecture 700, as would be understood by one of skill in the art upon reading the present descriptions.

Architecture 700 depicts an exemplary implementation of the addition of further data by client c0 602 in key k1 to the storage 504. Key k1 is part of the key group g0 (see client c0 key group g0 information 604 as shown in FIG. 6).

Client c0 602 writes data object M1 702 with data m1. Operation 704 includes sending the data object M1 702 with data m1 to the meta-generator 606. The meta-generator 606 identifies 2 data chunks 706 as shown (e.g., data chunk d1 708 and data chunk d2 710). Data chunk d1 708 is associated with fingerprint S1 and data d1. Data chunk d2 710 is associated with fingerprint S2 and data d2. Metadata 712 includes the key group identifier g0 and keyID kid.k1 indicating that the data is encrypted with the secret key associated with keyID kid.k1. Operation 714 includes sending fingerprints S1 and S2 to storage 504. The key group identifier g0 allows storage 504 to ascertain that the dedup keyID is kid.kd from the group information previously transferred (e.g., client c0 key group g0 information 604, see also request 358 with reference to FIG. 3).

Storage 504 examines the current chunk metadata table 528 and determines that S1 is a new fingerprint. Storage 504 examines the current chunk metadata table 528 and determines that S2 already exists in kid.k0. Chunk S2 (e.g., data chunk d2 710) may be deduplicated using the group g0 dedup kid.kd. Storage 504 may request 716 that client c0 602 send chunk S1 (e.g., data chunk d1 708) in kid.k1 and chunk S2 in kid.kd. Client c0 602 encrypts 718 data chunk d1 in key k1 and sends 720 the encrypted chunk with the metadata (e.g., including the fingerprint S1 and keyID kid.k1) to storage 504. Client c0 602 encrypts 722 data chunk d2 in key kd and sends 724 the encrypted chunk with the metadata (e.g., including the fingerprint S2 and keyID kid.kd) to storage 504. This latter operation backports chunk S2 from keyID kid.k0 to keyID kid.kd, thus allowing the chunk to be decrypted by both the key user associated with the key k0 and the key user associated with key k1.

Storage 504 stores the chunks and updates the chunk metadata table 528. Row 4 of the table 528 shows the update for S2 to include information that the chunk was also written by client c0 602 in kid.k1 and has a reference count of 1 in this keyID and changes the encryption keyID to kid.kd. The location is shown as 15, such as for a copy on write system. The location stays at 14 in a direct overwrite system. Row 5 is new metadata indicating the chunk S1 was written by client c0 602, encrypted in the secret key associated with keyID kid.k1, accessed with kid.k1, and has a reference count of 1 in that key and stored in location 16.

Figure 8:
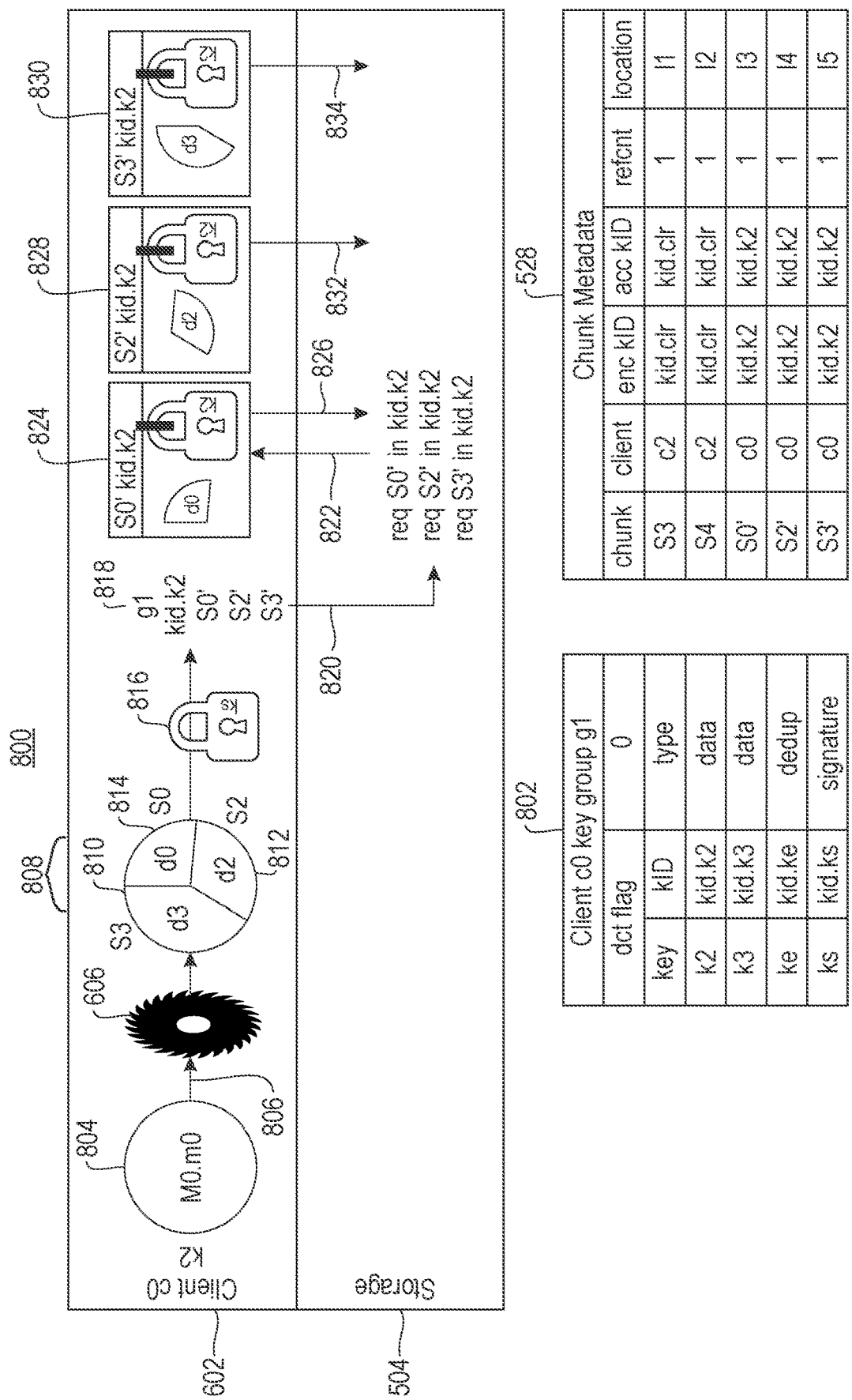
FIG. 8 is a high level architecture, in accordance with one aspect of the present invention.

FIG. 8 depicts a high-level architecture, in accordance with various configurations. The architecture 800 may be implemented in accordance with the present invention in any of the environments depicted in FIGS. 1-7 and 9-11, among others, in various configurations. Of course, more or less elements than those specifically described in FIG. 8 may be included in architecture 800, as would be understood by one of skill in the art upon reading the present descriptions.

Data privacy is increased if deduplication with cleartext is not allowed. Architecture 800 depicts an exemplary implementation of the addition of further data by client c0 602 in key k2 to the storage 504 without allowing dedup against cleartext. In this architecture, it is assumed that the operations follow those shown in FIG. 5.

Client c0 key group g1 information 802 comprises the dct flag (dedup to cleartext) set to 0 to indicate data written in keyIDs belonging to group g1 may be deduped but not against data written in cleartext. Client c0 key group g1 information 802 includes data key k2 and k3 with respective keyIDs kid.k2 and kid.k3. Client c0 key group g1 information 802 includes dedup key ke with keyID kid.ke. Client c0 key group g1 information 802 includes the fingerprint key ks having keyID kid.ks where dedup against cleartext is not allowed.

Where the data in encrypted, meta-generator 606 resides in the client c0 602. Meta-generator 606 is analogous to meta-generator 316 described in detail above with reference to FIGS. 3-4.

Client c0 602 writes data object M0 804 with data m0. Operation 806 includes sending the data object M0 804 with data m0 to the meta-generator 606. The meta-generator 606 identifies 3 data chunks 808 as shown (e.g., data chunk d3 810, data chunk d2 812 and data chunk d0 814). Data chunk d3 810 is associated with fingerprint S3 and data d3. Data chunk d2 812 is associated with fingerprint S2 and data d2. Data chunk d0 814 is associated with fingerprint S0 and data d0. The fingerprints are encrypted at 816 with secret fingerprint key ks. S0 is encrypted to S0', S2 to S2', and S3 to S3'. The metadata 818 including key group identifier g1 and keyID kid.k2 (e.g., indicating that the data is encrypted with the secret key associated with keyID kid.k2), and the encrypted fingerprints S0', S2', and S3' are sent 820 to storage 504. The key group identifier g1 allows storage 504 to ascertain that the dedup keyID is kid.ke, from the group information previously transferred (e.g., client c0 key group g1 information 802, see also request 358 with reference to FIG. 3). The key group identifier g1 allows storage 504 to ascertain that dedup against cleartext data is not allowed for client c0 group g1.

Storage 504 examines current chunk metadata table 528 of FIG. 5 and determines that S0', S2', and S3' are new fingerprints. The fingerprint for chunk S3 (e.g., data chunk d3 810) is encrypted to S3' and this value is passed to storage 504. Thus, even though the data content d3 matches for the chunk S3 stored in the table 528 and written by client c2 (see FIG. 5), storage 504 does not dedup against this chunk since the encrypted fingerprint S3' does not match. Thus, encrypting the fingerprints cryptographically isolates the deduplication domain of client c0 group g1 from other groups. Storage 504 is unable to determine if any data content in a first group matches any content in a second group.

Where cleartext dedup is not allowed, storage 504 does not compare fingerprints of cleartext chunks. The dedup operations of storage 504 restrict fingerprint comparisons to those keyIDs belonging to the key group for the operation. If fingerprints from different groups match, dedup is still not performed (e.g., in general, with a cryptographic hash fingerprint, the probability of such a collision may be vanishingly small). This reduces the table space that needs to be searched for fingerprint matches. For example, even though the cleartext fingerprints for data chunk 810 and data chunk 516 (FIG. 5) match, the metadata fingerprints S3' and S3 do not match.

Storage 504 requests 822 that client c0 602 send chunks S0', S2', and S3' in kid.k2. Client c0 602 encrypts 824 data chunk d0 in key k2 and sends 826 the encrypted chunk with metadata including the encrypted fingerprint S0' and keyID kid.k2 to storage 504. Similarly, chunks S2 and S3 area encrypted 828, 830, respectively. The encrypted chunks and metadata including the respective encrypted fingerprints and keyIDs are sent 832, 834 to storage 504, respectively.

Storage 504 stores the chunks and updates the chunk metadata table 528. Row 3 is new metadata, indicating the chunk S0' was written by client c0 602, encrypted in the key associated kid.k2, accessible with kid.k2, has a reference count of 1 in keyID kid.k2, and is stored in location 13. Row 4 shows similar information for chunk S2'. Row 5 shows similar information for chunk S3'.

Figure 9:
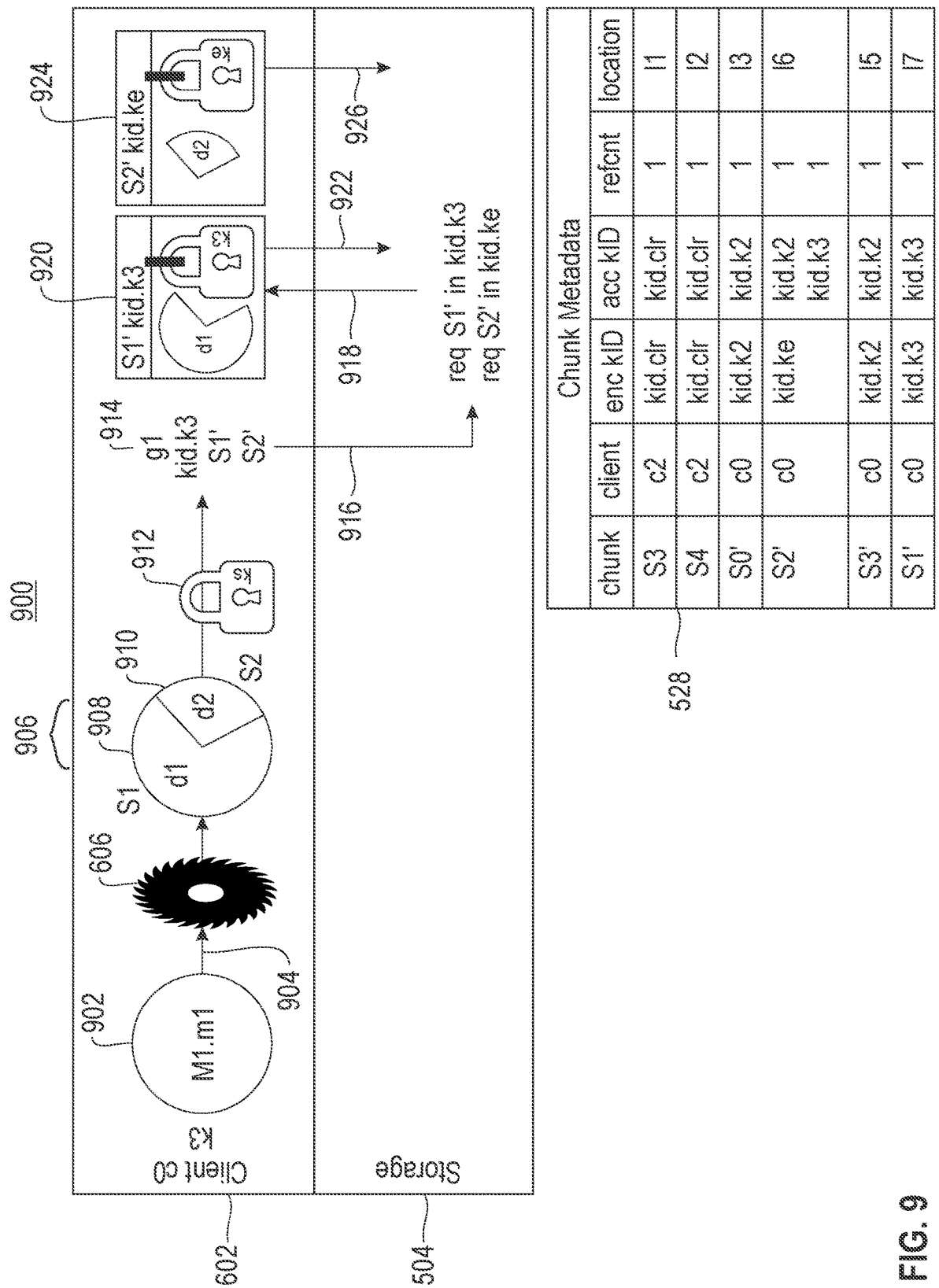
FIG. 9 is a high level architecture, in accordance with one aspect of the present invention.

FIG. 9 depicts a high-level architecture, in accordance with various configurations. The architecture 900 may be implemented in accordance with the present invention in any of the environments depicted in FIGS. 1-8 and 10-11, among others, in various configurations. Of course, more or less elements than those specifically described in FIG. 9 may be included in architecture 900, as would be understood by one of skill in the art upon reading the present descriptions.

Architecture 900 depicts an exemplary implementation of the addition of further data by client c0 602 in key k3. Key k3 is part of key group g1 (see client key group information 802 in FIG. 8). In this architecture, it is assumed that the operations follow those shown in FIG. 8.

Client c0 602 writes data object M1 902 with data m1. Operation 904 includes sending the data object M1 902 with data m1 to the meta-generator 606. The meta-generator 606 identifies 2 data chunks 906 as shown (e.g., data chunk d1 908 and data chunk d2 910). Data chunk d1 908 is associated with fingerprint S1 and data d1. Data chunk d2 910 is associated with fingerprint S2 and data d2. The fingerprints are encrypted at 912 with secret fingerprint key ks. S1 is encrypted to S1 and S2 to ST. The metadata 914 including key group identifier g1 and keyID kid.k3 (e.g., indicating that the data is encrypted with the secret key associated with keyID kid.k3), and the encrypted fingerprints S1' and S2' are sent 916 to storage 504. The key group identifier g1 allows storage 504 to ascertain that the dedup keyID is kid.ke, from the group information previously transferred (e.g., client c0 key group g1 information 802, see also request 358 with reference to FIG. 3).

Storage 504 examines a chunk metadata table 528 of FIG. 8 and determines that S1' is a new fingerprint and S2' already exists in kid.k2. Chunk S2' may be deduplicated using the group g1 dedup key ke. Storage 504 requests 918 that client c0 602 send chunk S1' in kid.k3 and chunk ST in kid.ke. Client c0 602 encrypts 920 data chunk d1 in key k3 and sends 922 the encrypted chunk with metadata including the encrypted fingerprint S1' and keyID kid.k3 to storage 504. Similarly, client c0 602 encrypts 924 data chunk d2 in key ke and sends 926 the encrypted chunk with metadata including the encrypted fingerprint S2' and keyID kid.ke to storage 504. This latter operation backports chunk S2' from keyID kid.k2 to keyID kid.ke, thus allowing the chunk to be decrypted by both the key user associated with key k1 and the key user associated with key k2.

Storage 504 stores the chunks and updates the chunk metadata table 528. Row 4 shows the update for S2' includes information that the chunk was also written by client c0 602 in kid.k1, has a reference count of 1 in keyID kid.k1, changes the encryption keyID as kid.ke and is now stored at location 16. Row 6 is new metadata indicating that the chunk S1' was written by client c0 602, encrypted in the key associated with kid.k3, accessible with kid.k3, has a reference count of 1 in keyID kid.k3 and is stored in location 17.

As described in the foregoing architectures, it is beneficial to keep a reference count for each keyID for each chunk. Thus, a non-zero reference count in a given keyID is required to read a data chunk. If a chunk has a positive reference count, the count is decremented each time a chunk reference is deleted, until the counter reaches 0. Once the reference count reaches 0, the keyID may be removed from the access keyID list for the chunk. This removal occurs while the reference count in other keyIDs is non-zero.

Figure 10:
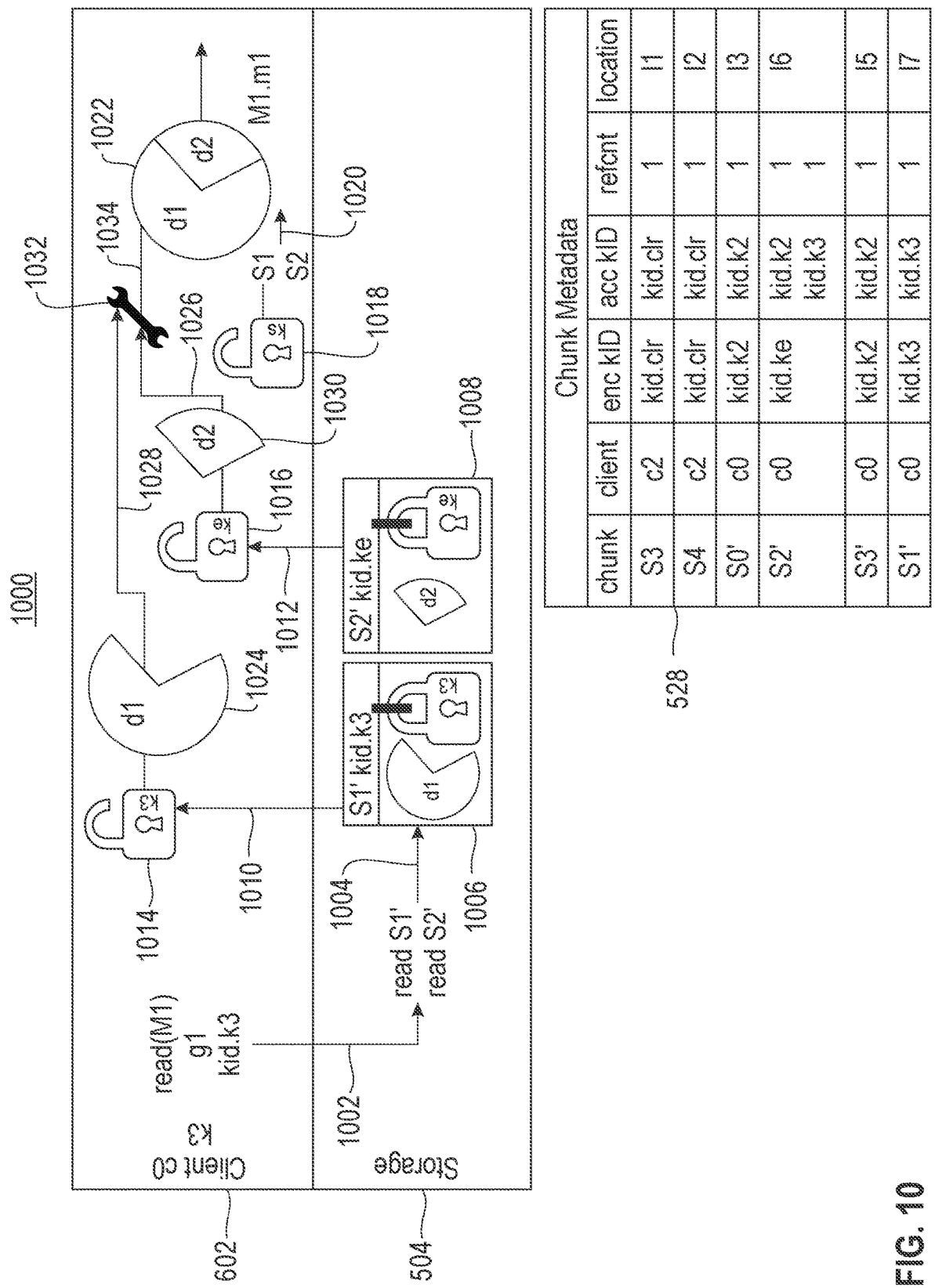
FIG. 10 is a high level architecture, in accordance with one aspect of the present invention.

FIG. 10 depicts a high-level architecture, in accordance with various configurations. The architecture 1000 may be implemented in accordance with the present invention in any of the environments depicted in FIGS. 1-9 and 11, among others, in various configurations. Of course, more or less elements than those specifically described in FIG. 10 may be included in architecture 1000, as would be understood by one of skill in the art upon reading the present descriptions.

Architecture 1000 illustrates an exemplary read operation for data object M1 (see FIG. 9). Data object M1 was written in keyID kid.k3. Operation 1002 includes client c0 602 issuing the read request for M1 with group g1 and kid.k3 as tags to storage 504. Storage 504 determines that chunks S1' and ST comprise object M1, in a manner known to one having ordinary skill in the art (e.g., from an object chunk manifest). Storage 504 reads S1' and S2' at operation 1004. Chunk S1' and associated metadata 1006 and chunk S2' and associated metadata 1008 are sent 1010, 1012, respectively, to client c0 602 for dechunking. Chunk S1' is decrypted 1014 using data key k3 determined from keyID kid.k3 in the metadata. Chunk S2' is decrypted 1016 using dedup key ke determined from the keyID kid.ke in the metadata. The fingerprints are decrypted 1018 using the fingerprint key ks determined from the key group g1 policy (the fingerprint path to decryption 1018 is not shown). The decrypted fingerprints 1020 S1 and S2 may be compared with the fingerprints of the decrypted data chunks d1 1024 and d2 1030 to check for data corruption. Decrypted chunks 1024, 1030 are sent 1028, 1026, respectively, to the chunk merger 1032. The merged chunk 1022 is the data object M1 with data m1. The data object M1 is returned 1034 to complete the read operation.

Now referring to FIG. 11, a flowchart of a method 1100 is shown according to one aspect. The method 1100 may be performed in accordance with the present invention in any of the environments depicted in FIGS. 1-10, among others, in various aspects. Of course, more, or fewer operations than those specifically described in FIG. 11 may be included in method 1100, as would be understood by one of skill in the art upon reading the present descriptions.

Each of the steps of the method 1100 may be performed by any suitable component of the operating environment. For example, in various aspects, the method 1100 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, method 1100 includes operation 1102. Operation 1102 includes sending key group information to a storage system. The key group information may be sent to the storage system in any manner known in the art. The key group information preferably includes keyID information for client data keys in the key group. The client data keys belonging to the key group may be either client secret keys or a client deduplication key. The key group information preferably does not include the actual client secret keys or the actual client deduplication key. In preferred approaches, a key group comprises client secret keys for encrypting data. The client secret keys are associated with the key group. KeyIDs are not easily predictable and/or determinable from the key itself in preferred approaches. A random value and/or a value encrypted in a separate key may be used to generate keyIDs. Any other technique for generating the keyIDs may be used.

In various aspects, the client data keys enable deduplication of data chunks which are encrypted in any of the client data keys in the key group. For example, client data encrypted in a client secret key belonging to a key group may be deduped against other data encrypted in that client secret key or data encrypted in any other client secret key in the key group. The client secret keys provide the ability to dedup across the set of keys in the key group without the storage system having access to the client secret keys. In preferred approaches, the key group includes a secret dedup key (e.g., the client deduplication key) to encrypt deduped chunks to enable deduplication across the set of client secret keys.

Operation 1104 includes generating deduplication information. The deduplication information includes fingerprints associated with chunks of client data. Deduplication information preferably includes deduplication opportunities. In some approaches, a meta-generator identifies and/or calculates deduplication fingerprints (e.g., rolling min hashes, cryptographic hashes, etc.). In other approaches, other components known in the art may identify and/or calculate deduplication fingerprints for identifying deduplication opportunities. In some approaches, metadata is generated which is associated with the data deduplication opportunities (e.g., deduplication information) including pointers, chunk lengths, chunk fingerprints, etc. In preferred approaches, the deduplication information is generated (e.g., including at least the chunk fingerprints) before encrypting the data and/or data chunks to be sent to the storage system as described below.

Deduplication information may include operation details of a deduplication method as would be understood by one having ordinary skill in the art upon reading the present disclosure. In one configuration, for a chunking dedupe, the deduplication information may include chunk start locations, chunk lengths, chunk signatures, similarity information, etc. In one approach, the chunk fingerprint is a cryptographic hash which may be calculated in any manner known in the art.

In some optional approaches, portions of the data deduplication information, such as the chunk fingerprints, may be encrypted with the client secret fingerprint key. The client secret fingerprint key is preferably unavailable to the storage system. A client secret fingerprint key encrypter may encrypt the fingerprints with the client secret fingerprint key as would be understood by one having ordinary skill in the art upon reading the present disclosure. In preferred aspects, the fingerprints are encrypted with the client secret fingerprint key prior to sending the deduplication information to the storage system.

Operation 1106 includes encrypting the data chunks with one of the client data keys. In preferred approaches, the data chunks are encrypted prior to sending the data chunks to the storage system. In various approaches, the data chunks are encrypted with one of the client secret keys in the key group. A corresponding decryption key for the encrypted data chunks is not available to the storage system in preferred aspects.

Operation 1108 includes sending the deduplication information to the storage system for use in a deduplication process by the storage system. The deduplication information may be sent to the storage system in any manner known in the art. In preferred approaches, the storage system uses the deduplication information to identify data chunks for deduplication based on the deduplication information. For data chunks which are not identified for deduplication, the storage system may request client data associated with those data chunks. The client data associated with those data chunks is encrypted in one of the client secret keys as would be understood by one having ordinary skill in the art in view of the present disclosure. The client data associated with the data chunks preferably includes corresponding keyID information identifying the client secret key used to encrypt the data chunk(s). In various approaches, a request may be received from the storage system for client data associated with data chunks which are not identified for deduplication by the storage system. The client data associated with the data chunks encrypted in the client secret key may be sent to the storage system in response to the request in any manner known in the art.

Operation 1110 includes sending the encrypted data chunks to the storage system. In some approaches, the encrypted data chunks are sent to the storage system in response to a request from the storage system. In other approaches, the encrypted data chunks may be sent to the storage system in response to a request from the client or from another source known in the art. The request may include a request for data chunks and/or associated data according to any of the aspects described in detail above. The request preferably also requests the keyID information which identifies a client data key used for encrypting the data chunks. The encrypted data chunks may be sent to the storage system in any manner known in the art.

In some approaches, a request may be received from the storage system for client data associated with data chunks stored in the storage system which are encrypted in a client secret key. The request preferably includes that the client data associated with the data chunks may be sent to the storage system encrypted in a client deduplication key. The client data may be sent to the storage system in response to the request in any manner known in the art in view of the present disclosure.

The storage system performs deduplication according to the various aspects described herein. The storage system may deduplicate data chunks stored in the storage system against chunks of the client data, wherein the data chunks are selected for deduplication using the deduplication information. In one approach, the deduplication manager locates and/or identifies duplicate data based on the deduplication information. For a chunking deduplication, the deduplication information is used with chunk metadata to identify data chunks that are duplicates. For example, the deduplication manager compares the pointers, fingerprints, chunk lengths, etc., from the decrypted deduplication information to any pointers, fingerprints, chunk lengths, etc., stored in a chunk metadata repository on the storage system. The deduplication manager performs any associated deduplication operations as would be understood by one having ordinary skill in the art upon reading the present disclosure. In preferred approaches, the storage system stores metadata for the data chunks wherein the metadata includes a key identifier which uniquely identifies the key used to encrypt the data chunks.

In various approaches, encrypted data stored in the storage system is retrieved in response to a request for the client data from a client connected to the storage system. The request may include a plurality of requests for client data as would be understood by one having ordinary skill in the art. Further, the request may include a request (or plurality of requests) for client data in more than one of the client data keys. The storage system preferably identifies the data chunks associated with the data request. The method for retrieving encrypted data from the storage system includes retrieving metadata associated with the data chunks. The metadata preferably includes the keyID information. The storage system retrieves the encrypted client data associated with the data request based on the metadata according to any of the approaches described herein. The encrypted client data may be sent to the client in any manner known in the art as would be understood by one having ordinary skill in the art in view of the present disclosure. The encrypted client data may be received as data chunks in some approaches. One or more of the data chunks may be encrypted with the client secret key and one or more different data chunks are encrypted with a client deduplication key.

In preferred approaches, the client secret keys never leaves the client side. In this preferred approach, a storage system does not see the encrypted data in the clear at any point in a data transfer. In this preferred approach, the client data keys are not shared with the storage system, any other clients, any other storage system, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
sending key group information to a storage system, wherein the key group information includes keyID information for client data keys in the key group, wherein the client data keys enable deduplication of data chunks encrypted in any of the client data keys in the key group;
generating deduplication information, wherein the deduplication information includes fingerprints associated with chunks of client data;
encrypting the data chunks with one of the client data keys, wherein a corresponding decryption key for the encrypted data chunks is not available to the storage system;
sending the deduplication information to the storage system for use in a deduplication process by the storage system; and
sending the encrypted data chunks to the storage system.

2. The computer-implemented method of claim 1, wherein encrypted data chunks are sent to the storage system in response to a request from the storage system, wherein the request from the storage system also requests the keyID information which identifies the client data key used for encrypting each of the data chunks.

3. The computer-implemented method of claim 1, wherein each of the client data keys is a type of key selected from the group consisting of: a client secret key and a client deduplication key.

4. The computer-implemented method of claim 3, wherein the request from the storage system is for client data associated with data chunks which are not identified for deduplication by the storage system, the method comprising sending the client data associated with the data chunks encrypted in a client secret key.

5. The computer-implemented method of claim 1, comprising, in response to a request from the storage system for client data associated with data chunks which are identified for deduplication by the storage system, sending the client data associated with the data chunks encrypted in a client deduplication key.

6. The computer-implemented method of claim 1, comprising:

encrypting the fingerprints with a client secret fingerprint key prior to sending the deduplication information to the storage system.

7. The computer-implemented method of claim 3, comprising:
requesting the client data from the storage system; and
receiving the client data as the data chunks, wherein one or more of the data chunks are encrypted with the client secret key and one or more other of the data chunks are encrypted with the client deduplication key.

8. A computer-implemented method, comprising:
receiving key group information at a storage system, wherein the key group information includes keyID information for client data keys in the key group, wherein the client data keys enable deduplication of data chunks encrypted in any of the client data keys in the key group;
receiving encrypted client data for storage in the storage system;
receiving deduplication information, wherein the deduplication information is accessible to the storage system for performing operations thereon, wherein the deduplication information includes fingerprints associated with chunks of the encrypted client data;
identifying data chunks for deduplication based on the deduplication information; and
for data chunks which are not identified for deduplication, requesting client data associated with the data chunks encrypted in one of the client data keys.

9. The computer-implemented method of claim 8, wherein each of the client data keys is a type of key selected from the group consisting of: a client secret key and a client deduplication key.

10. The computer-implemented method of claim 8, comprising, in response to a request for client data from the client,
identifying the data chunks associated with the data request;
retrieving metadata associated with the data chunks, wherein the metadata includes the keyID information;
retrieving the encrypted client data associated with the data request based on the metadata; and
sending the encrypted client data to the client.

11. The computer-implemented method of claim 8, wherein the keyID information identifies the client data key used for encrypting each of the data chunks associated with the data request.

12. The computer-implemented method of claim 8, wherein the fingerprints are encrypted with a client secret fingerprint key, wherein the client secret fingerprint key is unavailable to the storage system.

13. The computer-implemented method of claim 9, comprising:
identifying data chunks which are stored in the storage system encrypted in one of the client data keys; and
requesting client data associated with the data chunks encrypted in the client deduplication key.

14. A system, comprising:
a processor; and
logic integrated with the processor, executable by the processor, or integrated with and executable by the processor, the logic being configured to:
send key group information to a storage system, wherein the key group information includes keyID information for client data keys in the key group, wherein the client data keys enable deduplication of data chunks encrypted in any of the client data keys in the key group;
generate deduplication information, wherein the deduplication information includes fingerprints associated with chunks of client data;
encrypt the data chunks with one of the client data keys, wherein a corresponding decryption key for the encrypted data chunks is not available to the storage system;
send the deduplication information to the storage system for use in a deduplication process by the storage system; and
send the encrypted data chunks to the storage system.

15. The system of claim 14, wherein encrypted data chunks are sent to the storage system in response to a request from the storage system, wherein the request from the storage system also requests the keyID information which identifies the client data key used for encrypting each of the data chunks.

16. The system of claim 14, wherein each of the client data keys is a type of key selected from the group consisting of: a client secret key and a client deduplication key.

17. The system of claim 16, wherein the request from the storage system is for client data associated with data chunks which are not identified for deduplication by the storage system, the system comprising logic configured to send the client data associated with the data chunks encrypted in a client secret key.

18. The system of claim 14, comprising logic configured to, in response to a request from the storage system for client data associated with data chunks which are identified for deduplication by the storage system, send the client data associated with the data chunks encrypted in a client deduplication key.

19. The system of claim 14, comprising logic configured to encrypt the fingerprints with a client secret fingerprint key prior to sending the deduplication information to the storage system.

20. A system, comprising:
a processor; and
logic integrated with the processor, executable by the processor, or integrated with and executable by the processor, the logic being configured to:
receive key group information at a storage system, wherein the key group information includes keyID information for client data keys in the key group, wherein the client data keys enable deduplication of data chunks encrypted in any of the client data keys in the key group;
receive encrypted client data for storage in the storage system;
receive deduplication information, wherein the deduplication information is accessible to the storage system for performing operations thereon, wherein the deduplication information includes fingerprints associated with chunks of the encrypted client data;
identify data chunks for deduplication based on the deduplication information; and
for data chunks which are not identified for deduplication, request client data associated with the data chunks encrypted in one of the client data keys.

21. The system of claim 20, wherein each of the client data keys is a type of key selected from the group consisting of: a client secret key and a client deduplication key.

22. The system of claim 20, comprising logic configured to, in response to a request for client data from the client, identify the data chunks associated with the data request;
retrieve metadata associated with the data chunks, wherein the metadata includes the keyID information;
retrieve the encrypted client data associated with the data request based on the metadata; and
send the encrypted client data to the client.

23. The system of claim 20, wherein the keyID information identifies the client data key used for encrypting each of the data chunks associated with the data request.

24. The system of claim 20, wherein the fingerprints are encrypted with a client secret fingerprint key, wherein the client secret fingerprint key is unavailable to the storage system.

25. A computer program product, the computer program product comprising:
one or more computer readable storage media, and program instructions collectively stored on the one or more computer readable storage media, the program instructions comprising:
program instructions to send key group information to a storage system, wherein the key group information includes keyID information for client data keys in the key group, wherein the client data keys enable deduplication of data chunks encrypted in any of the client data keys in the key group;
program instructions to generate deduplication information, wherein the deduplication information includes fingerprints associated with chunks of client data;
program instructions to encrypt the data chunks with one of the client data keys, wherein a corresponding decryption key for the encrypted data chunks is not available to the storage system;
program instructions to send the deduplication information to the storage system for use in a deduplication process by the storage system; and
program instructions to send the encrypted data chunks to the storage system.

* * * * *